US006415821B2

(12) United States Patent
Kamholz et al.

(10) Patent No.: US 6,415,821 B2
(45) Date of Patent: Jul. 9, 2002

(54) MAGNETICALLY ACTUATED FLUID HANDLING DEVICES FOR MICROFLUIDIC APPLICATIONS

(75) Inventors: Andrew Kamholz; Anson Hatch; Karl Bohringer; Paul Yager, all of Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/739,074

(22) Filed: Dec. 15, 2000

Related U.S. Application Data

(63) Continuation-in-part of application No. 09/464,379, filed on Dec. 15, 1999.

(51) Int. Cl.$^7$ .............................................. F15C 1/04
(52) U.S. Cl. ........................ 137/827; 137/251.1; 417/92
(58) Field of Search .............................. 137/827, 251.1; 417/92

(56) References Cited

U.S. PATENT DOCUMENTS

| | | | |
|---|---|---|---|
| 2,670,749 A | 3/1954 | Germer .......................... 137/1 |
| 3,448,751 A | 6/1969 | Rosaen ...................... 137/81.5 |
| 4,254,800 A | 3/1981 | Masaki ........................ 137/827 |
| 4,928,125 A | 5/1990 | Iino ............................ 346/140 |
| 4,967,831 A | 11/1990 | Leland ................... 165/104.25 |
| 5,005,639 A | 4/1991 | Leland ................... 165/104.25 |
| 5,333,646 A | 8/1994 | Delot ........................... 137/827 |
| 5,377,721 A | 1/1995 | Kiyohiro et al. ............. 137/807 |
| 5,656,196 A | 8/1997 | Tsuda et al. .............. 252/62.52 |
| 5,667,716 A | 9/1997 | Ziolo et al. ............... 252/62.52 |
| 5,716,852 A | 2/1998 | Yager et al. ................. 436/172 |
| 5,851,416 A | 12/1998 | Raj et al. .................. 252/62.52 |
| 5,879,580 A | 3/1999 | Tsuda et al. .............. 252/62.52 |
| 5,922,210 A | 7/1999 | Brody et al. ................. 210/767 |
| 5,948,684 A | 9/1999 | Weigl et al. .................. 436/52 |
| 5,955,029 A | 9/1999 | Wilding et al. ............. 422/68.1 |
| 5,972,710 A | 10/1999 | Weigl et al. ................... 436/34 |
| 6,007,775 A | 12/1999 | Yager ........................... 422/57 |

OTHER PUBLICATIONS

Bökenkamp, d. et al. (Jan. 1998), "Microfabricated Silicon Mixers for Submillisecond Quench–Flow Analysis," Anal. Chem. 70:232–236.

(List continued on next page.)

*Primary Examiner*—John Rivell
(74) *Attorney, Agent, or Firm*—Greenlee, Winner and Sullivan, P.C.

(57) ABSTRACT

Magnetically actuated fluid handling devices using magnetic fluid to move one or more fluids (gases or liquids or both) through microsized flow channels are provided. Fluid handling devices include micropumps and microvalves. Magnetically actuated slugs of magnetic fluid are moved within microchannels of a microfluidic device to facilitate valving and/or pumping of fluids and no separate pump is required. The magnets used to control fluid movement can be either individual magnets moved along the flow channels or one or more arrays of magnets whose elements can be individually controlled to hold or move a magnetic slug. Fluid handling devices include those having an array of electromagnets positioned along a flow channel which are turned on and off in a predetermined pattern to move magnetic fluid slugs in desired paths in the flow channel. The fluid handling devices of the present invention can handle gases and liquids simultaneously and thus can be made to be self-priming. These devices are more resistant to fluctuations in fluid input than other types of micropumps which need to be tuned to pump either liquid or gas. In a particular embodiment, a micropump having a loop channel containing a stationary magnetic slug and one or more moving slugs is provided.

26 Claims, 18 Drawing Sheets

OTHER PUBLICATIONS

Flounders, A.W. et al. (1997), "Patterning of Immobilized Antibody Layers via Photolithography and Oxygen Plasma Exposure," Biosens. Bioelectron. 12(6):447–456.

Greivell, N.E. and Hannaford, B. (Mar. 1997), "The Design of a Ferrofluid Magnetic Pipette," IEEE Trans. Biomed. Eng. 44(3):129–135.

Greivell, N.E., "The Design of a Ferrofluid–Magnetic Pipet," MSEE Thesis, University of Washington, Dept. of Electrical Engineering, Jun. 1995.

Harrison, D.J. et al. (1992), "Capillary Electrophoresis and Sample Injection Systems Integrated on a Planar Glass Chip," Anal. Chem.64 (17):1926–1932.

Hartshorne, H. et al., "Development of Microfabricated Valves for µTAS," Micro TAS Conference Proceedings, Banff, Alberta, Canada, Oct. 1998, pp. 379–381.

Hartshorne, H. et al., "Integrated Microfabricated Ferrofluidic Valves and Pumps for µTAS," poster presented at DARPA Conference, Dec. 3, 1998, San Diego, CA.

Hartshorne, H. et al., Microfabricated Ferrofluidic Valves and Pumps, poster presented at DARPA Conference, Jul. 31, 1999, Pittsburgh, PA.

Hodder, P.S. et al. (Sep. 1997), "Microfabricated Flow Chamber for Fluorescence–based Chemistries and Stopped–flow Injection Cytometry," Analyst 122:883–887.

Kenis, P.J. et al. (Jul. 1999), "Microfabrication Inside Capillaries Using Multiphase Laminar Flow Patterning," Science 285:83–85.

Liakopoulos, T.M. et al. (Sep. 1995), "Micromachined Thick Permanent Magnet Arrays on Silicon Wafers," IEEE Trans. on Magnetics 32(5):5154–5156.

Miller, C.W., "Magnetic Fluids: Magnetic Forces and Pumping Mechanisms," Ph.D. Thesis, Cornell University, Dept. of Aerospace Engineering, Jan. 1974.

Ratner, B.D. (1995), "Surface Modification of Polymers: Chemical, Biological and Surface Analytical Challenges," Biosens. Bioelectron. 10(9–10):797–804.

Shoji, S. and Esashi, M. (1994), "Microflow Devices and Systems," J. Micromech. Microeng. 4:157–171.

Yang, J. et al. (Mar. 1999), "Cell Separation on Microfabricated Electrodes Using Dielectrophoretic/Gravitational Field–Flow Fractionation," Anal. Chem. 71:911–918.

Dubois, E. et al., "Structural analogy between aqueous and oily magnetic fluids"(Oct. 5, 1999), vol. III, No. 15:7147–7160.

Szabo, D. et al., "Shape Transition of Magnetic Field Sensitive Polymer Gels" (Sep. 22, 1998) Macromolecules, 31(19):6541–6548.

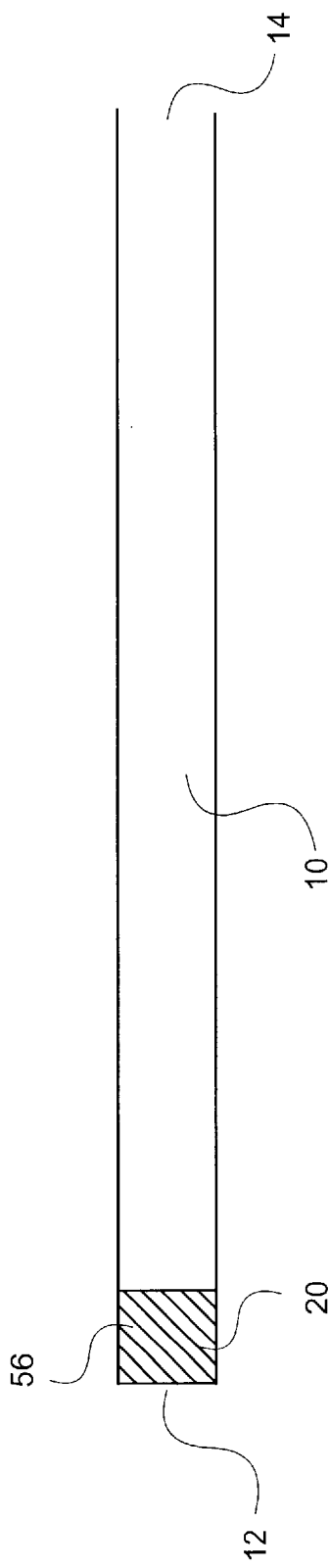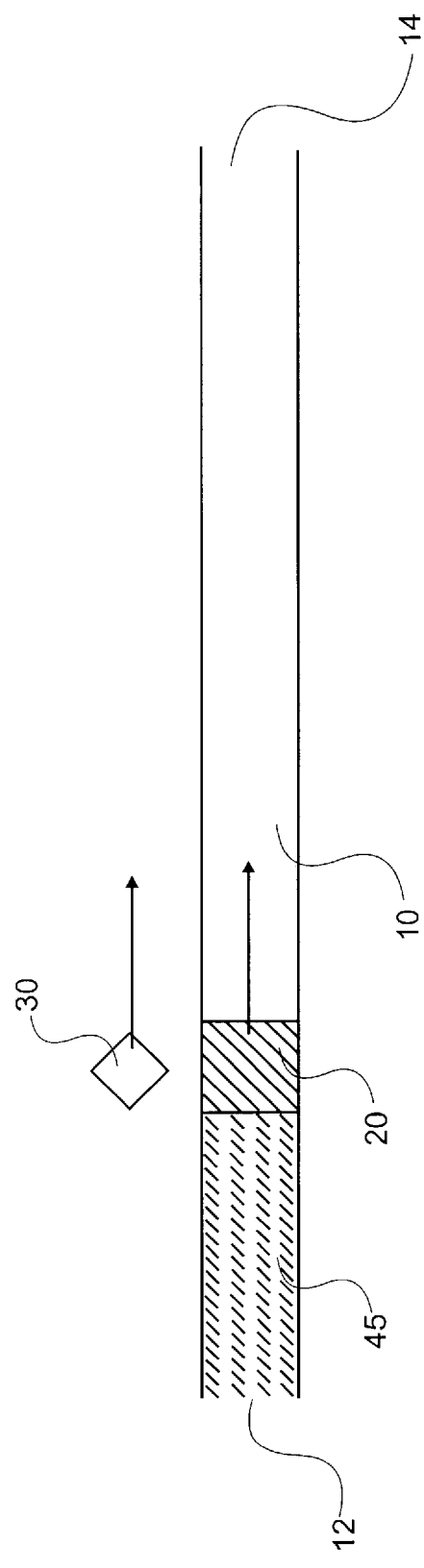

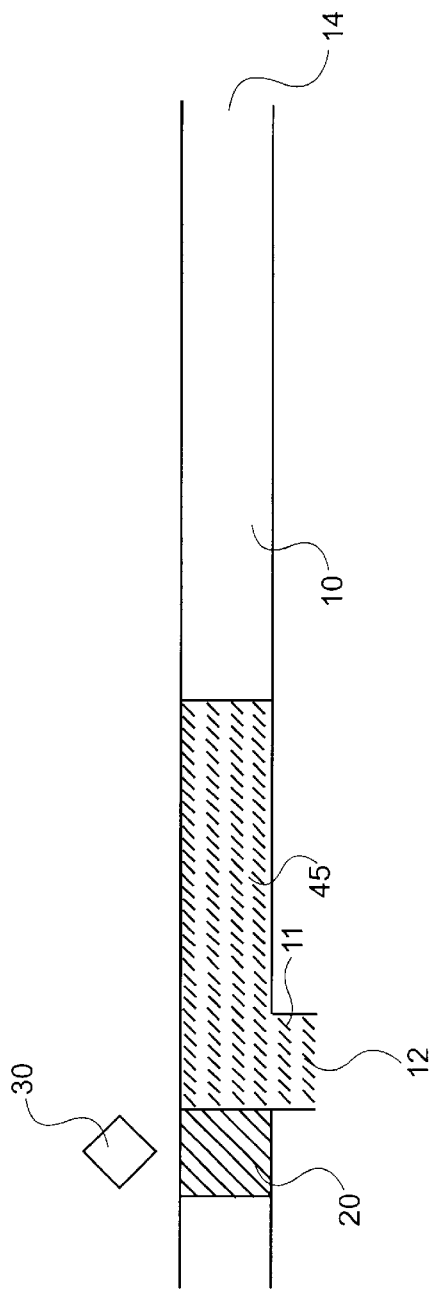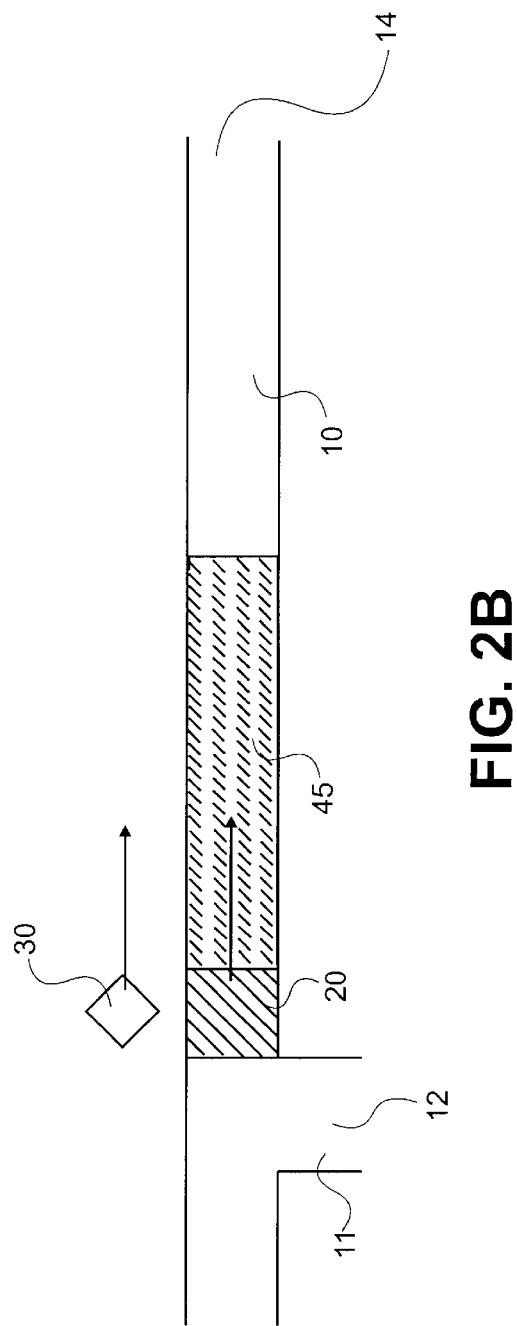

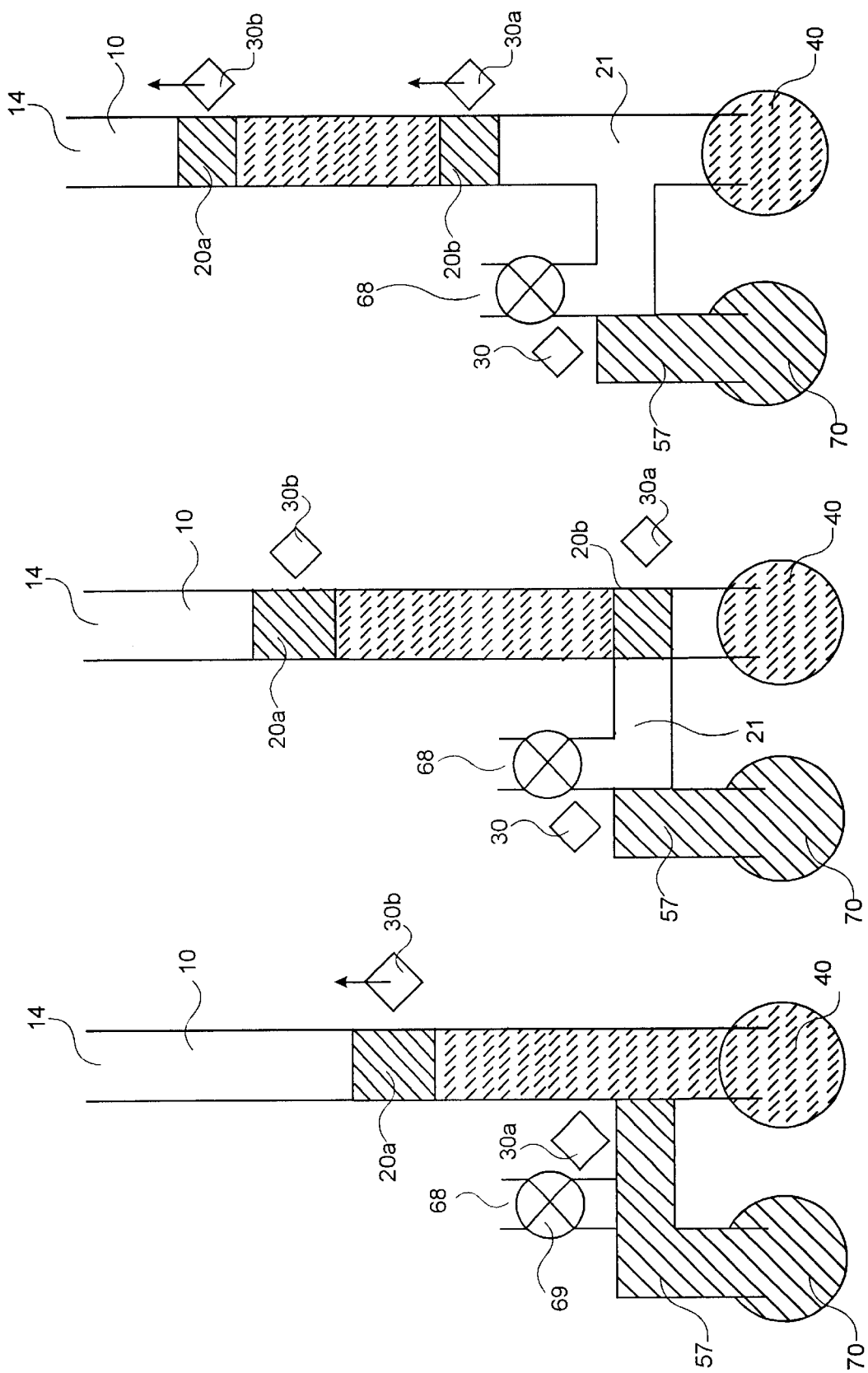

MAGNETICALLY ACTUATED FLUID HANDLING DEVICES FOR MICROFLUIDIC APPLICATIONS

CROSS REFERENCED TO RELATED APPLICATIONS

This application is a continuation in-part of co-pending application Ser. No. 09/464,379 filed Dec. 15, 1999, which is incorporated herein by reference to the extent not inconsistent herewith.

BACKGROUND OF THE INVENTION

This invention relates generally to fluid handling devices, specifically to magnetically actuated devices employing slugs made of a magnetic fluid to control fluid movement through microsized flow channels.

Miniature fluid handling devices to control fluid movement, which include micropumps and microvalves for use in microfluidic devices, can be constructed using fabrication techniques adapted from those applied to integrated circuits. Microfluidic devices have environmental, biomedical, medical, biotechnical, printing, analytical instrumentation, and miniature cooling applications.

Several different kinds of micropumps exist that can control flow on the order of microliters per minute (S. Shoji and M. Esashi (1994), "Microflow Devices and Systems", J. Micromech. and Microeng.4:157–171). Micropumps with moving parts include peristaltic pumps and reciprocating pumps. These reciprocating pumps have a pressure chamber with a diaphragm driven by an actuator and passive check valves. Passive micropumps with no moving parts include electrohydrodynamic, electro osmotic, and ultrasonic pumps. U.S. Pat. No. 5,876,187 describes methods of making micro machined pumps.

Electroosmotic pumps, which rely on the use of chargeable surfaces within the pump, are generally applied to fluid handling in microsized systems (D. J. Harrison et al. (1992), "Capillary Electrophoresis and Sample Injection Systems Integrated on a Planar Glass Chip", Analytical Chemistry, 64 (17): 1926–1932). Chargeable surfaces have a fixed charge on their surface when in contact with an appropriate fluid. Electro osmotic pumping also requires the presence of counterions in the fluid adjacent the charged surface. Appropriate application of an electric field to a channel having a chargeable surface causes flow of the counterions of the fluid in the channel and as a result flow of the fluid as a whole to effect pumping in the channel. However, the pumping rate is dependent upon the pH, ionic strength and ion concentration of the fluid. Electro osmotic pumping may not be useful for applications where these fluid properties change or where they are unknown.

U.S. Pat. Nos. 4,967,831 and 5,005,639, both issued to Leland, disclose magnetically actuated macrosized piston pumps that in one embodiment use a magnetically confined ferrofluid slug as a self-sealing and self-repairing pump piston. The pumps were described for use in heat pipes. There is no description of the use of these pumps in microfluidic systems. The pumps described employ permanent ring magnets and electromagnets surrounding a conduit, but this configuration cannot readily be adapted to microconduits.

Ferrofluid slugs have recently been used as seals in micro fabricated valves and as pistons in microfabricated pumps (H. Hartshorne et al., "Development of Microfabricated Valves for µTAS", MicroTAS Conference Proceedings, Banff, Alberta, Canada, October 1998, pp. 379–381; H. Hartshorne et al., "Integrated Microfabricated Ferrofluidic Valves and Pumps for ATAS", poster presented at DARPA Conference, Dec. 3, 1998, San Diego, Calif.; H. Hartshorne et al., "Microfabricated Ferrofluidic Valves and Pumps", poster presented at DARPA Conference, Jul. 31, 1999, Pittsburgh, Pa.). The references report valving of gases and liquids and pumping of gases, but not liquids. The pump design described has a ferrofluid piston moving in a side channel separate from the flow channel containing the fluid inlet and outlet. Therefore, this piston is unable to also act as a valve in the main flow channel where the inlet and outlet are located.

Ferrofluids have been used in the design of magnetic pipettes (Greivell, N. E. and Hannaford, B. (1997), "The Design of a Ferrofluid Magnetic Pipette," IEEE Transactions on Biomedical Engineering 44(3):129–135).

Macroscale pumps have been attempted using ferrofluids as described in C. W. Miller (1974), "Magnetic Fluids: Magnetic Forces and Pumping Mechanisms," Ph.D. Thesis, Cornell University, however such pumps require special coatings and seals not required by the present invention.

SUMMARY OF THE INVENTION

The present invention is generally directed to magnetically actuated fluid handling devices employing slugs made of a magnetic fluid to move a fluid through microsized flow channels. These fluid handling devices include micropumps and microvalves.

In a first embodiment, this invention provides a fluid handling device having at least one microsized flow channel in fluid communication with at least one fluid inlet and at least one fluid outlet. At least one slug of magnetic fluid is located within the flow channel and can be held stationary by a magnet to block fluid flow through the flow channel. The slug can also be moved by a magnet to pull or push fluid through the flow channel.

In other embodiments of this invention, the device described above can incorporate additional features to allow a variety of fluid handling operations. For example, a fluid handling device can incorporate one or more inlets and outlets for magnetic fluid slugs to enter and leave the flow channel. A slug inlet can be connected to a source of magnetic fluid to allow two or more slugs separated by fluid to be generated. A slug outlet allows a slug to be pulled out of the way of the fluid behind it. One or more air vents may also be incorporated into these devices to facilitate separation of slugs from a reservoir of magnetic fluid with air and to alternate different fluids in the flow channel.

One primary advantage of the fluid handling devices described herein over other micropumps is that the magnetically actuated slug moves within the flow channels of the microfluidic device to facilitate valving and/or pumping of fluid and no separate pump is required.

In another embodiment, this invention provides a fluid handling device having at least one microsized flow channel forming a loop. The flow channel is in fluid communication with at least one fluid inlet and at least one fluid outlet, including a first fluid inlet and a last fluid outlet which are adjacent, yet separated by a channel volume, from each other along the fluid channel loop. The device also has at least two slugs of magnetic fluid, both located within the flow channel loop. At least one slug is moved around the flow channel loop by a magnet to pull and push fluid from fluid inlets towards fluid outlets of the flow channel loop. The slug is moved in the loop passing the first inlet, any intermediate outlets and inlets, past the last outlet, and through the channel volume separating the last outlet from the first inlet. At least one slug is held stationary by another magnet between the last fluid outlet and the first fluid inlet to block fluid flow through the flow channel loop back into the first fluid inlet. The moving slug of magnetic fluid merges with and passes through the stationary plug of magnetic fluid as it moves around the fluid channel loop. The combined action of the slugs in the channel has the net effect of pumping fluid from the fluid inlets and to the fluid outlets and particularly from the first fluid inlet to the last fluid outlet. The volume of the stationary slug is preferably less than the channel volume between the last fluid outlet and the first fluid inlet, except when the stationary slug is merged with the moving slug. The volume of the moving slug is preferably less than the channel volume between the most closely spaced fluid inlet and outlet in the channel loop, so that adjacent inlets and outlets along the loop channel are not both blocked by the moving slug. Also, if two or more sets of fluid inlets and outlets are present, at least two moving slugs are used.

One embodiment of this invention takes advantage of the shape-changing capabilities of magnetic gels, which are also magnetic fluids as defined herein, to form valves and pumps. Such magnetic gels are described, e.g. in Szabo, D. et al. (1998), "Shape Transition of Magnetic Field Sensitive Polymer Gels," Macromolecules 31:6541–6548.

In all the embodiments of this invention, the magnets for holding or moving the magnetic slug(s) may be located on one side or both sides of the flow channel assembly, rather than surrounding the flow channels, simplifying assembly of the microfluidic device. In addition, the magnets used to control the magnetic fluid slug movement can be either individual magnets moved along the flow channels in a flow channel assembly or an array of magnets mapping the flow channel assembly whose elements can be individually controlled to hold or move a magnetic slug. For example, using an array of electromagnets, magnets positioned along a flow channel can sequentially be turned on and off to create the same effect as a magnet moving along the flow channel. Alternatively, magnetic fields can be generated at selected points within the flow channel.

Methods for using the fluid handling devices of this invention as well as microfluidic devices employing one or more fluid handling devices of the present invention are also provided. These microfluidic devices may combine the fluid handling devices of the present invention with microfluidic devices already described in U.S. Pat. No. 5,922,210 (Tangential Flow Planar Microfabricated Fluid Filter and Method of Using Thereof), U.S. Pat. No. 5,716,852 (Microfabricated Diffusion-Based Chemical Sensor), U.S. Pat. No. 5,972,710 (Microfabricated Diffusion-Based Chemical Sensor), U.S. Pat. No. 5,948,684 (Simultaneous Analyte Determination and Reference Balancing in Reference T-Sensor Devices), U.S. patent applications Ser. No. 09/346,852 (Microfabricated Differential Extraction Device and Method), Ser. No. 08/823,747 (Device and Method for 3-Dimensional Alignments of Particles in Microfabricated Flow Channels), Ser. No. 08/938,093 (Multiple Analyte Diffusion-Based Chemical Sensor), U.S. Pat. No. 6,007,775 (Multiple Analyte Diffusion Based Chemical Sensor) (Separation and Chemical Reaction), U.S. Pat. No. 5,948,684 (Simultaneous Analyte Determination and Reference Balancing in Reference T-Sensor Devices), U.S. patent application Ser. No. 09/080,691 (Liquid Cartridge Analysis), and U.S. Pat. No. 5,971,158 (Absorption-Enhanced Differential Extraction Device).

The fluid handling devices of the present invention can handle gases and liquids simultaneously. Therefore, these fluid handling devices can be made self priming. In addition, these devices are more resistant to nonuniformities in fluid input than other types of micropumps which need to be tuned to pump either liquid or gas. For example, in reciprocating pumps employing a piezoelectric actuator, the piezoelectric material is set to resonate at a given frequency which depends upon the compressibility of the medium being pumped.

BRIEF DESCRIPTION OF THE DRAWINGS

FIG. 1A is a top plan diagram of a magnetically actuated fluid handling device showing a magnetic fluid slug blocking fluid flow into a flow channel.

FIG. 1B is a top plan diagram of a fluid handling device showing a magnetic fluid slug pulling fluid from an inlet into a flow channel.

FIGS. 2A and 2B are top plan diagrams of a second fluid handling device illustrating two stages in using a magnetic fluid slug to push fluid through a flow channel.

FIGS. 4A, 4B, and 4C are top plan diagrams of a fourth fluid handling device illustrating three stages in using two magnetic fluid slugs together to push and pull fluid through a flow channel.

DESCRIPTION OF INVENTION

Figure 3C:
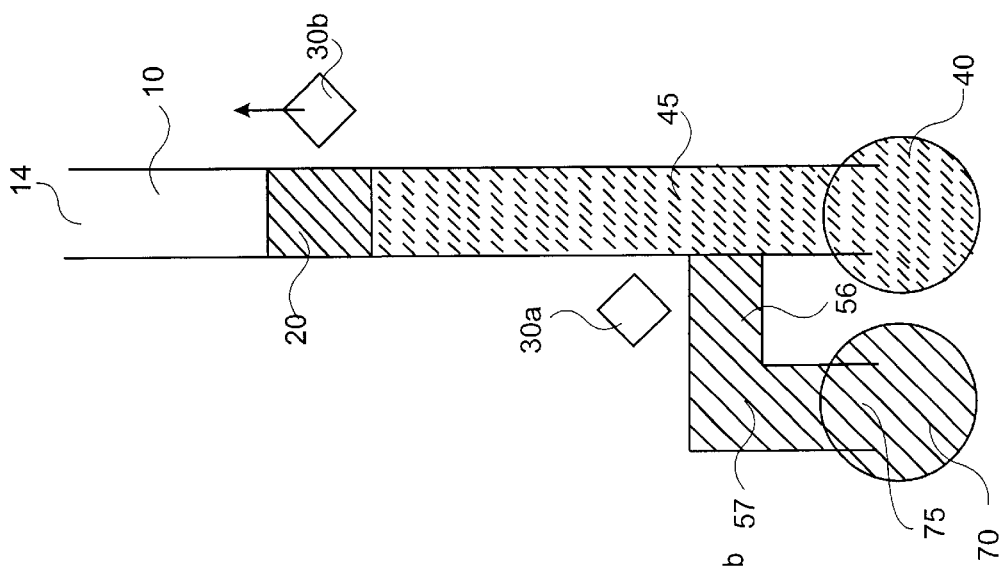
FIGS. 3A, 3B, and 3C are top plan diagrams of a third fluid handling device illustrating three stages in using a magnetic fluid slug to pull fluid through a flow channel.

This invention is further described by reference to the drawings, where the same numbers are used to identify like features. The description of FIGS. 1A and 1B is used to describe basic elements of the invention which are common to several of its embodiments.

FIG. 1A is a schematic top plan diagram of a simple magnetically actuated fluid handling device. In FIG. 1A, a single microsized flow channel 10 is present. A flow channel is a conduit through which it is possible for fluid to flow if the conduit is not blocked. A microsized channel cross-section has at least one dimension, depth or width, less than 1 mm. This definition incorporates cross-section dimensions of 0.1 micron to 500 micron that have been termed mesoscale in U.S. Pat. No. 5,955,029.

The flow channel is in fluid communication with at least one fluid inlet 12 and at least one fluid outlet 14. If two parts of the device are in fluid communication with each other it is possible for fluid to flow from one part of the device to the other unless the flow path is blocked. The fluid to be handled in the device may be either a liquid or a gas. The inlet and outlet are generally defined with respect to the direction of fluid flow, with fluid flowing from the inlet to the outlet. The fluid inlet 12 is defined such that the net flow of fluid through the inlet is into the flow channel or zero if the flow channel is blocked. Similarly, the fluid outlet 14 is defined such that the net flow of fluid through the outlet is out of the flow channel or zero if the flow channel is blocked. The inlet and outlet can be openings or channels which connect to reservoirs, other channels, or other microfluidic device elements. In a given device, an inlet may become an outlet and an outlet may become an inlet when the direction of fluid flow is changed, for example by changing the direction of motion of a magnetic fluid slug.

A slug 20 of magnetic fluid 56 is shown within the pump flow channel. A slug of magaetic fluid has sufficient volume to seal off a portion of a flow lnnel in a microfluidic device to the flow of fluid. A slug is a quantity of magnetic fluid that can be cohesively moved or held in a microchannel of a microfluidic device by application of a magnetic field. The quantity of magnetic fluid in a slug for a given application depends upon the application, the size of the channel, the path that it must traverse in the channel (e.g., around cornes, etc.), the type of fluid to be pumped, the pressure and flow rate of fluid. The preferred material for the slug is a magetic fluid, which consists of a suspension of magetic particles in a liquid or semisolid carrier whose movement within a micro sized flow channel can be controlled by the application of a magnetic field. The magnetic fluid can be a magnetic gel or a ferrogel. The magnetic fluid is resistant to agglomeration and sedimentation.

The magnetic particles in the magnetic fluid are sufficiently small so they do not interfere with the ability of the material to seal off a portion of the flow channel or the ability of the material to move through straight channels, curved channels or around comers in channels. The quantity and composition of the magnetic particles in the magnetic fluid are selected so that the slug material is capable of responding to the application of a magnetic field.

The carrier is selected so that it is immiscible with and does not react with the fluid(s) to be moved through the device. The carrier is also preferably selected so that it wets the flow channel with equal or greater wettability than the fluid(s) to be moved through the device. The viscosity of the carrier is preferably selected so that the resistance to flow of the magnetic fluid in the channel can be overcome by the applied magnetic field. These desirable carrier properties are maintained under the temperature, pressure and pH conditions required for a particular application. The response of the slug material also depends upon the magnetic strength of the magnet, the distance the magnet is placed from the device, and the viscosities of the carrier and type of fluid(s) to be moved through the device.

The fluid handling devices of this invention can be adapted for use with liquids or gases or both. Liquids that can be pumped, directed and/or valved, include both aqueous (water and aqueous solutions) and non-aqueous liquids. Non-aqueous solutions can be polar or non-polar liquids. Gases include oxygen, carbon dioxide, nitrogen and gas mixtures including air. Liquids may include those that are acidic or basic. Liquids to be pumped may include those that are themselves suspensions of particles or emulsions containing multiple phases. Liquids may also include gels or creams, as long as their viscosity is sufficiently low to allow the liquid to be pushed or pulled through the desired flow channels. Magnetic fluid and flow channel and device components are selected for compatibility with the liquid or gas to be pumped.

Two slugs of magnetic fluid may "pass through" each other in a microchannel. For example, a moving slug may pass through a slug held stationary. It will be appreciated that in such "passing through" two slugs merge and then separate as the moving magnet passes the stationary magnet. During merging of slugs, the magnetic fluid therein is intermingled. Magnetic fluid slugs in a given microfluidic device may be the same size or volume or may be different sizes or volumes.

The preferred material for the slug 20 is a ferrofluid, which is a stable colloidal suspension of magnetic particles in a carrier liquid. The particles, which have an average size of about 100 Angstroms, are coated with a surfactant to prevent the particles from sticking together, so that simple Brownian motion is sufficient to keep them apart. A variety of different ferrofluid compositions have been described. For example, ferrofluid compositions are described in U.S. Pat. Nos. 5,879,580; 5,851,416; 5,667,716; and 5,656,196, and Dubois, E, (1999) "Structural Analogy Between Aqueous and Oily Magnetic Fluids," J. Chem. Phys. 111(15): 7147–7160.

Ferrofluids are available commercially from Ferrofluidics Corporation, Nashua NH. One preferred ferrofluid composition for use with aqueous fluids is a proprietary product from the Ferrofluidics AGG E series which contains 1.4% by volume magnetite, 7–14% by volume oil-soluble dispersant, 80–91% by volume water-immiscible carrier liquid, and 1–2% by volume aromatic amine.

A magnet 30 provides a means for holding the slug 20 in place or moving the slug through a flow channel. The term magnet is most generally used, herein, to describe any source of a magnetic field. The magnet can be a permanent magnet or an electromagnet. The magnet can be located on a separate plate, fabricated on a chip (Liakopoulos, T. M, Zhang, W., and Ahn (1995), C. H., "Micro machined Thick Permanent Magnet Arrays on Silicon Wafers", IEEE Trans. on Magnetics, 32(5):5154–5156) or placed within a microchannel. To hold or move a slug through the flow channel, one or more magnets can be operated to be held or moved along the flow channel using one or more two-dimensional translation mechanisms, or an array of magnets can be used. For example, a magnet array can include a set of permanent magnets mounted on an array of solenoids. The solenoids are addressable individually and can move the individual permanent magnets toward and away from the flow channels, thereby effectively "switching on and off" localized magnetic fields that drive the slug. A magnet array can also include a set of electromagnets spaced periodically throughout the region the piston travels. The timing of operation can be electronically controlled, with the electromagnets turning on and off in sequence such that the slug is appropriately held or moved through the microchannel. In some cases, a magnet used to hold a slug stationary in a flow channel can be eliminated by redesigning part of the flow channel so that the magnetic fluid slug has a very high flow resistance in that area. For example, if a section of the flow channel were made narrow enough, the magnetic fluid slug could remain stationary in that section due to its high flow resistance. Programmed selective switching on and off of magnets in an array can be used to select paths for fluid flow through a microfluidic device having multiple fluid flow paths by appropriate valving with slugs held stationary and fluid pumping using moving slugs.

The fluid handling device shown in FIGS. 1A and 1B can be used to block fluid flow from the inlet 12 through the flow channel 10. A magnet 30 is used to bring the slug 20 up to the fluid inlet and hold it there.

The fluid handling device shown in FIGS. 1A and 1B can also be used as a simple fluid transport device to move fluid from one point to another. FIG. 1A shows the starting position of the slug 20, while FIG. 1B shows the slug pulling fluid 45 behind it as the magnet 30 moves the slug towards the fluid outlet 14. As the slug passes through the outlet, it pulls fluid through the outlet as well. Once fluid has been pulled into the channel, the direction of slug motion can be reversed, so that the slug can push fluid through the channel as well as pull it.

FIGS. 2A and 2B show a simple fluid handling device where a slug 20 is used to push fluid 45 in the flow channel 10 toward the fluid outlet 14. FIG. 2A shows the starting position of the slug 20, which is held in position with the magnet 30. The fluid inlet 12 is shown connected to inlet channel 11 through which fluid is injected. FIG. 2B shows the slug pushing fluid in the channel toward the fluid outlet. The magnet 30 is used to move the slug towards the fluid outlet. Rather than being injected into flow channel 10, fluid can also be allowed to enter the flow channel from the inlet by capillary action. In this case, a valve (which can be another slug) can be positioned in the flow channel on one side of the fluid inlet 12 and closed once the slug is moved to the other side of the fluid inlet 12. This valve can be placed in the flow channel 10 or in the inlet channel 11, for example, and is used to limit the amount of fluid 45 being moved.

Figure 3B:
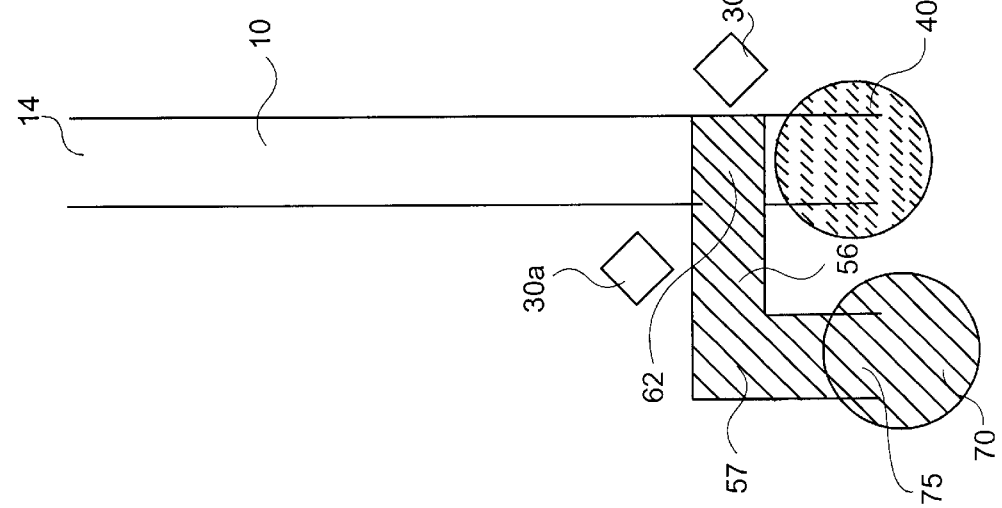
Figure 3A:
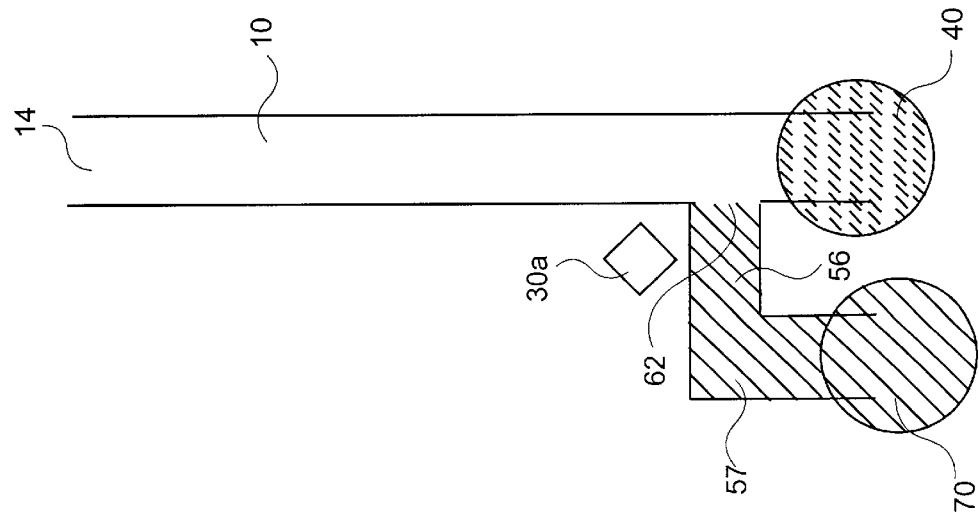

FIGS. 3A, 3B, and 3C show a fluid handling device which additionally contains a slug inlet 62 for conducting a slug 20 of magnetic fluid 56 into the flow channel 10, the slug inlet being in fluid communication with the flow channel. The slug inlet can include inlet channels 57, which may be connected to reservoirs (shown schematically as 70) of slug material 56, and can also include tubes, syringes, and like devices which can inject slug material. In FIG. 3A, the slug inlet is shown as slug inlet channel 57 connected to a slug reservoir 70. The slug inlet may contain a valve to limit fluid flow into the inlet or the closed end of a reservoir, tube or syringe may serve to limit fluid flow into the inlet. In FIG. 3A, the magnetic fluid present in the reservoir and inlet channel acts as a valve restricting fluid flow into the slug inlet. Also shown in FIGS. 3A, 3B, and 3C is a fluid reservoir (shown schematically as 40) in fluid communication with the fluid inlet. The slug and fluid reservoirs can have any shape which allows introduction and/or removal of fluids from the reservoirs. If capillary action or injection partially fills the flow channel 10 with fluid before a slug 20 is conducted into the flow channel, the slug can also be used to push the fluid in front of it along the flow channel.

FIGS. 3A, 3B, and 3C, respectively, show a sequence of steps in which a slug 20 is formed and used to pull fluid from the fluid reservoir 40 and out the fluid outlet 14. In FIG. 3A, a magnet 30a is used to pull magnetic fluid 56 out of the slug reservoir 70 and into the slug inlet channel 57. In FIG. 3B, magnetic fluid 56 is pulled into the flow channel 10 when magnet 30a is switched off (or moved away) and another magnet 30b is brought near the slug inlet 62 to draw magnetic fluid in the flow channel 10. In FIG. 3C, magnet 30b is used to move the magnetic fluid 56 in the channel toward outlet 14, forming a magnetic fluid slug 20 that separates from the slug reservoir and pulls fluid 45 from the fluid reservoir into the flow channel.

FIGS. 4A, 4B, and 4C show a fluid handling device similar to that shown in FIGS. 3A, 3B, and 3C, except that it additionally contains a vent 68 in the slug inlet channel (e.g., a valved inlet for introduction of a second fluid , e.g., a gas, such as air). This vent contains a valve 69 which allows the vent to be opened and closed. The position of the vent can be moved or additional vents can be added to achieve various types and combinations of fluid handling as would be readily apparent to one skilled in the art. The vent in FIGS. 4A–C is illustrated as an air vent to allow introduction of air into the flow channel. The vent may be connected to another fluid reservoir, e.g., a reservoir of air, nitrogen, inert gas or the like or a reservoir of liquid, e.g., oil, hydrocarbon, water or other liquid.

FIGS. 4A, 4B, and 4C, respectively, illustrate a sequence of steps in which two slugs 20a and 20b are formed in the flow channel 10, used together to push and pull fluid from the fluid reservoir through the flow channel and dispense a controlled amount of fluid through the outlet. In FIG. 4A, the vent is closed and the first slug is pulled into the flow channel and moved partway along the channel, pulling fluid behind it as described for FIG. 3C. FIG. 4B shows the vent being opened and a second slug 20b being pulled into the flow channel by a magnet. Because the vent is open, the second slug 20b is separated from the magnetic fluid in the slug inlet channel by a gap containing the fluid entering via the vent (e.g., air). FIG. 4C shows that as the magnet pulls the second slug 20b along the channel, it pushes fluid ahead of it and pulls vent fluid 21 into the inlet and flow channel behind it.

Figure 5A:
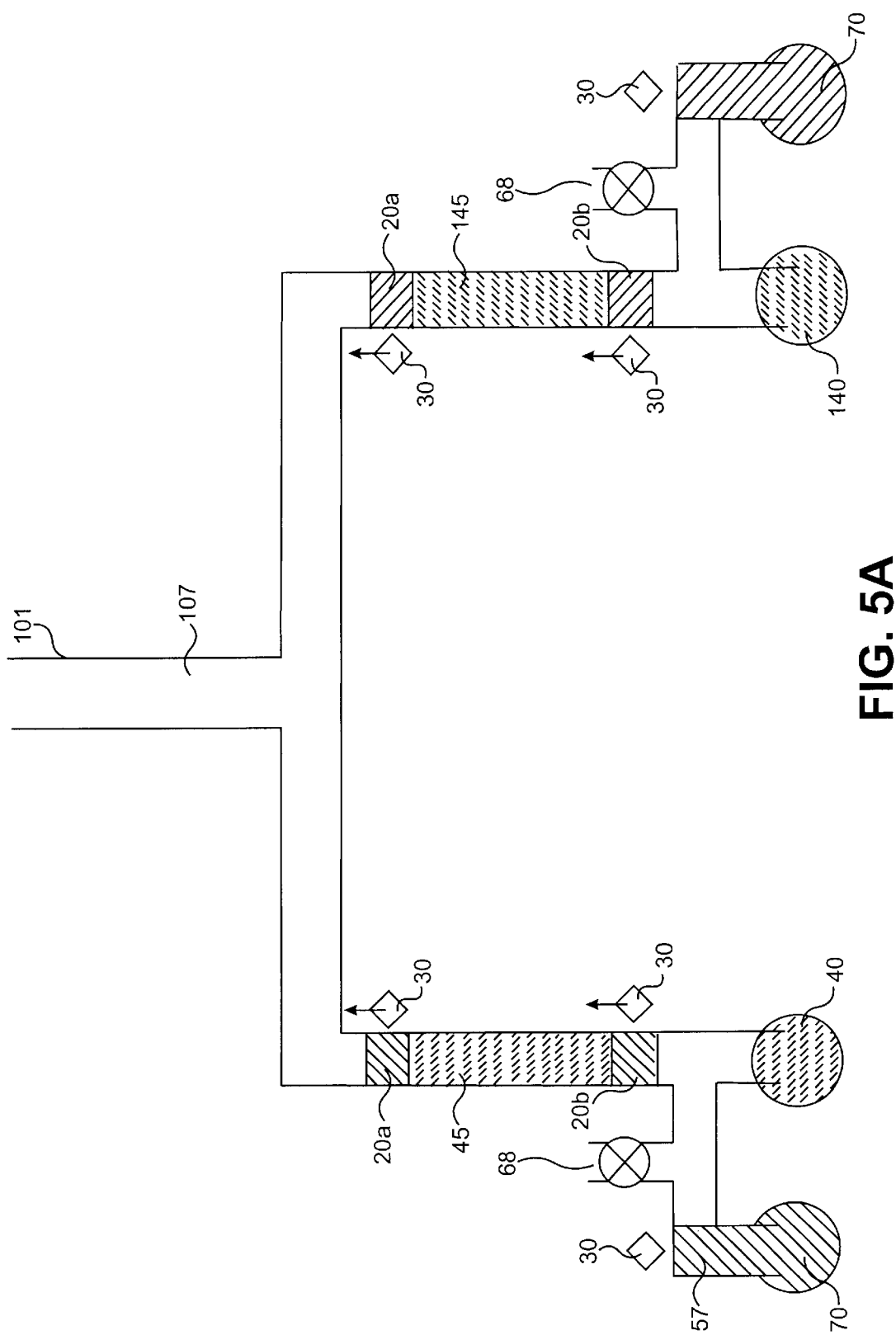
FIGS. 5A, 5B, and 5C are top plan diagrams of a fifth fluid handling device illustrating three stages in using two of the fluid handling devices shown in FIGS. 4A, 4B, and 4C to dispense controlled amounts of a sample and an indicator fluid to a T-sensor structure.
Figure 5B:
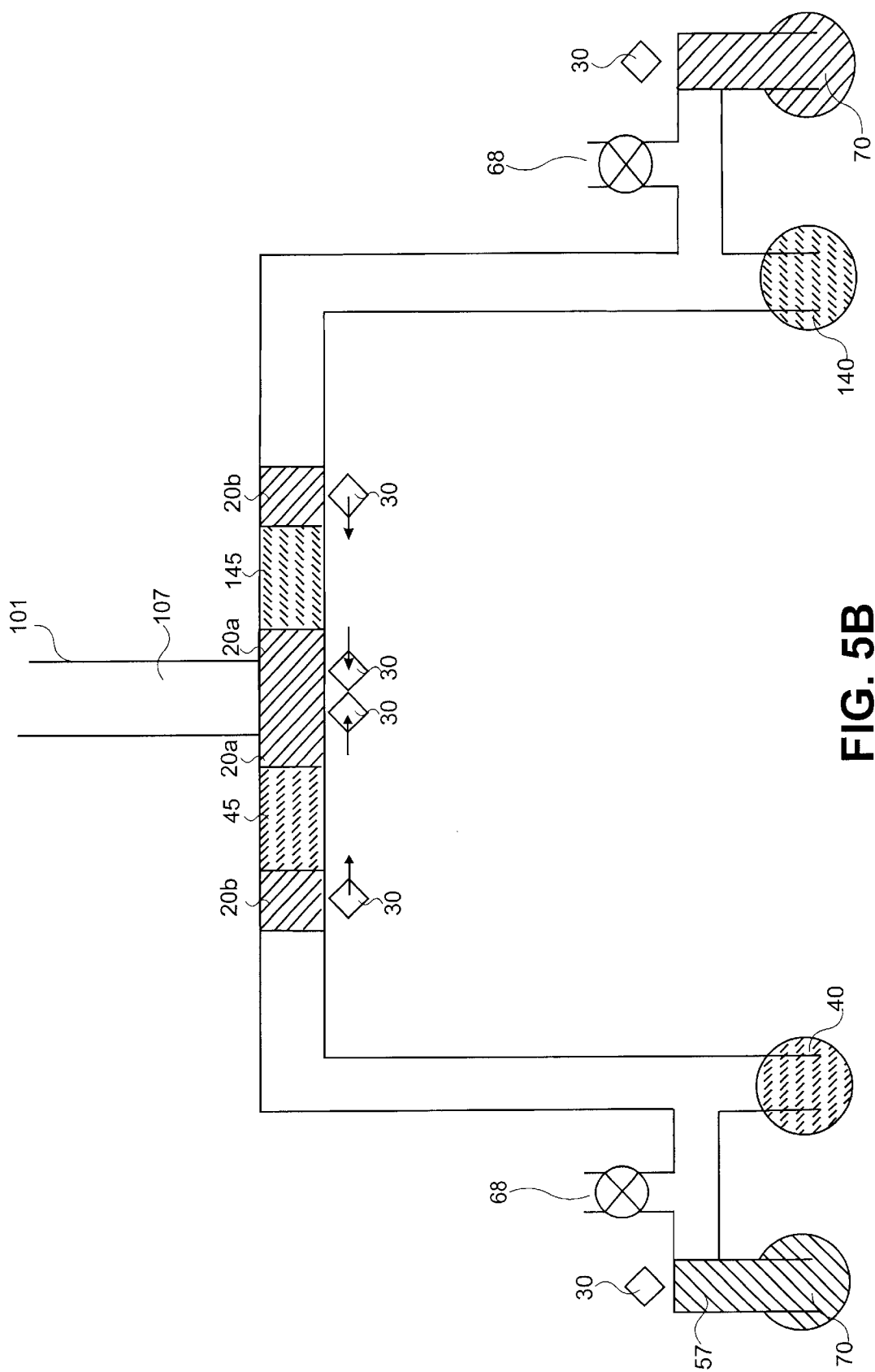
Figure 5C:
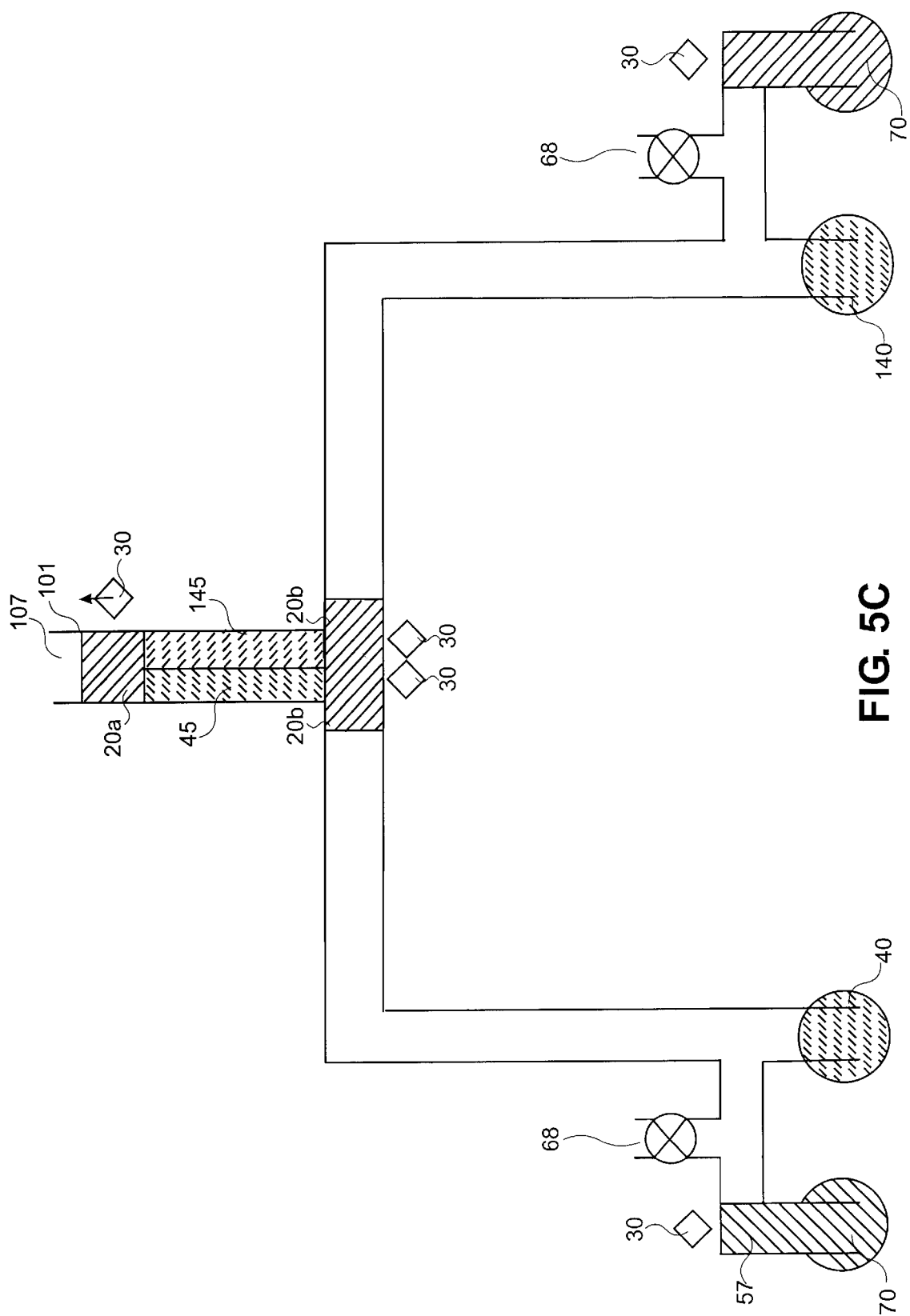

FIGS. 5A, 5B, and 5C illustrate a sequence of steps in which two of the fluid handling devices shown in FIG. 4A can be used together to dispense controlled amounts of a sample and an indicator fluid to a T-sensor structure 101 as described in U.S. Pat. No. 5,948,684. FIG. 5A shows two magnetic fluid slug pairs 20a and 20b drawing up sample and indicator fluid (45 and 145, respectively). FIG. 5B shows the fluids approaching the central channel 107 of the T-sensor structure. FIG. 5C shows the fluids in the central channel 107 of T-sensor structure 101, where diffusion of the fluids occurs.

Figure 6A:
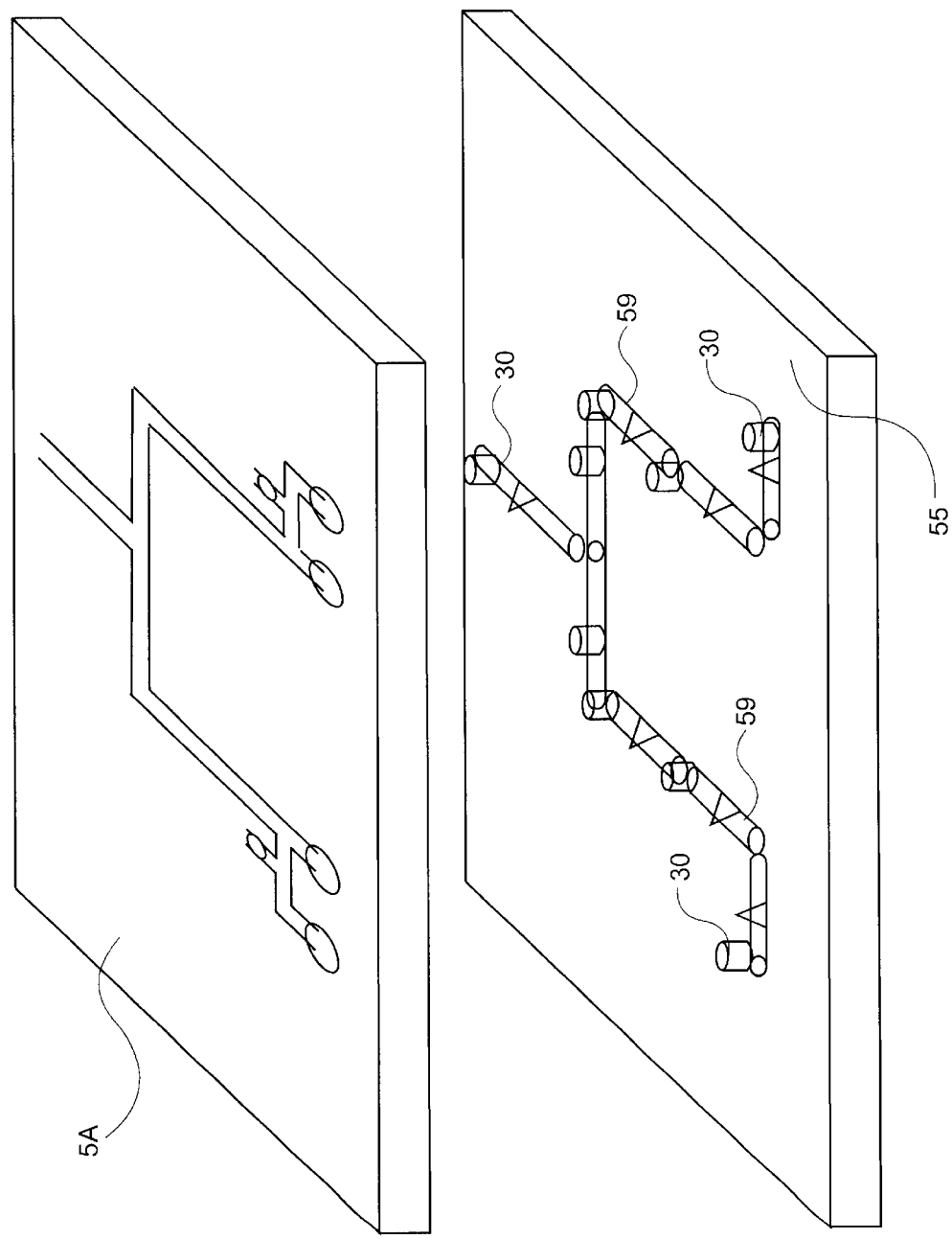
FIG. 6A schematically shows a set of individually addressable permanent magnets which can be used to control movement of magnetic fluid slugs in a fluid handling device. A separate plate contains the magnets which can be individually moved using linear translation drives.
Figure 6B:
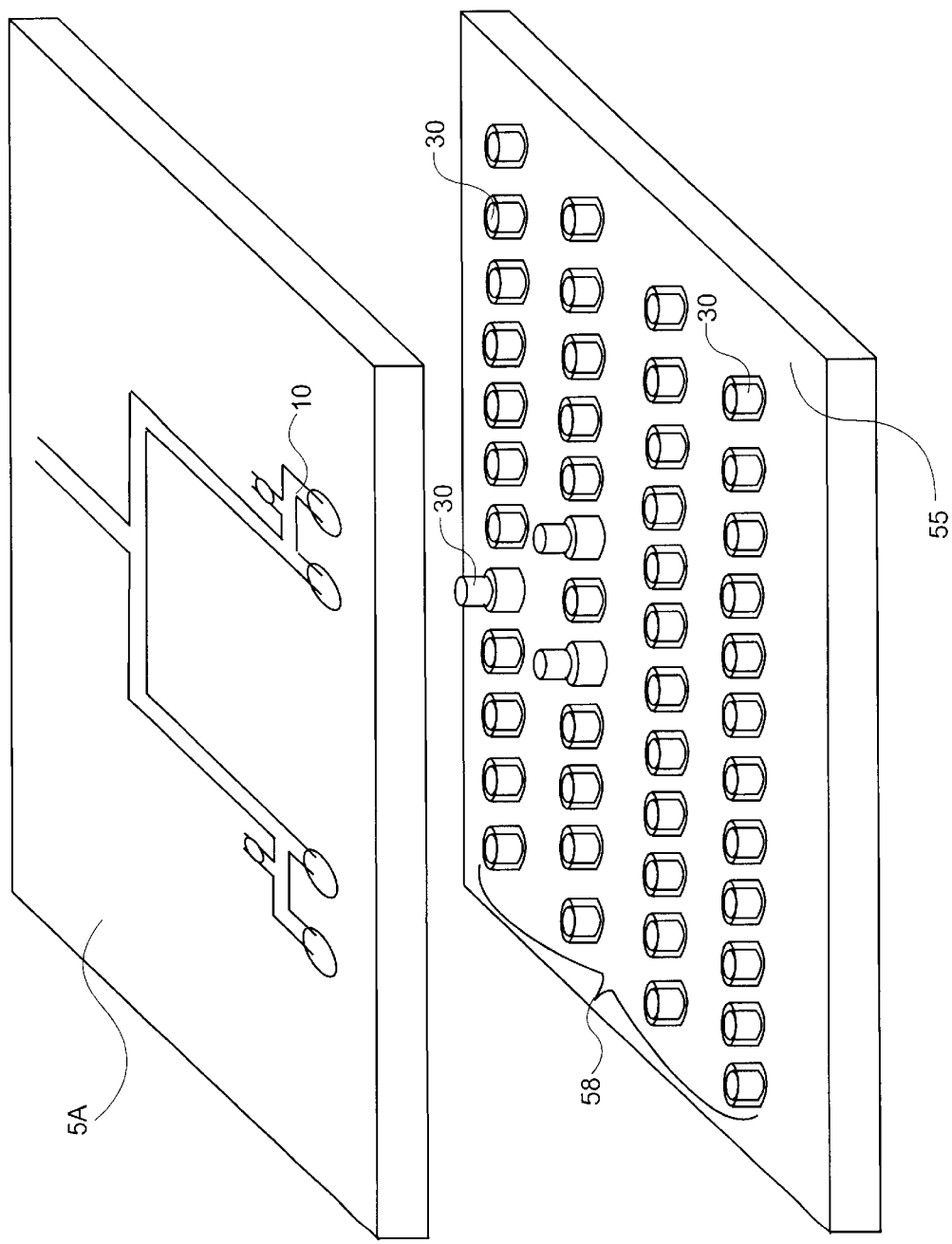
FIG. 6B schematically shows a programmable permanent magnet array which can be used to control movement of magnetic fluid slugs in a fluid handling device. A separate plate contains an array of individually addressable solenoids containing permanent magnets which can be individually moved in and out of proximity to a fluid handling device.
Figure 6C:
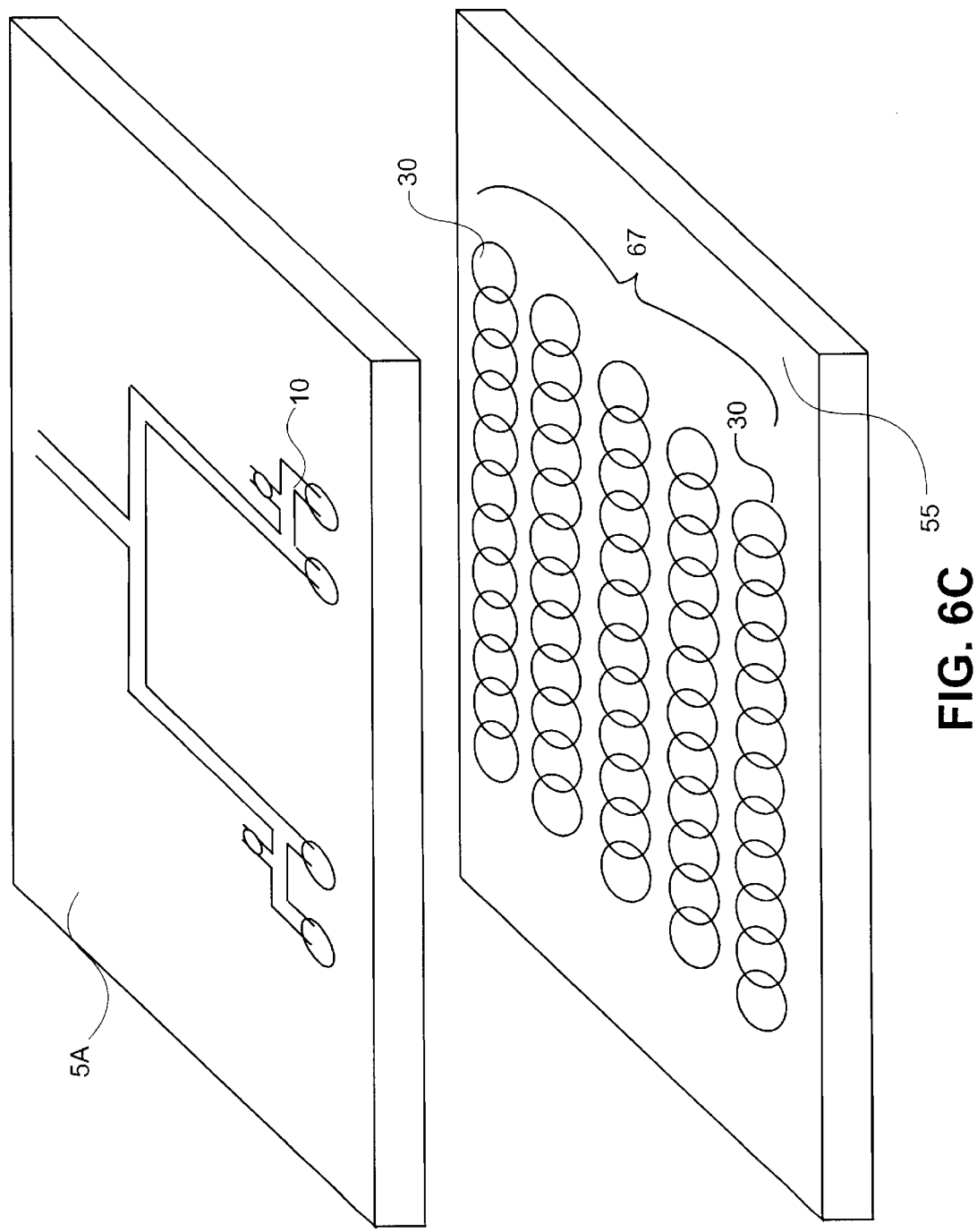
FIG. 6C schematically shows a programmable electromagnetic array which can be used to control movement of slugs of a magnetic fluid material in a fluid handling device. A separate plate contains an array of individually addressable electromagnets which can be individually turned on or off.

FIGS. 6A, 6B, and 6C show three different ways, respectively, of providing magnets to move the magnetic fluid slugs in a fluid handling device. For convenience, the fluid handling device shown is that in FIG. 5A. In these figures, the magnets 30 are located on in an array on a plate or substrate 55 separate from the fluid handling device. The array of magnets is sufficiently large to allow interaction with magnetic fluid in any flow channel (or combination of flow channels) in the device. The array of magnets thus will be selected and positioned to map the flow channels in the device (or at least to map those flow channels in which valving or pumping by magnetic slugs is desired). FIG. 6A shows a set of individually addressable permanent magnets 30 which can be individually moved along set paths 59 using linear translation drives (not shown). FIG. 6B shows an array 58 of individually addressable solenoids containing permanent magnets. The magnets of the array can be moved up and down to move them closer to or farther away from the channels 10 of the device (FIG. 5A). FIG. 6C shows an array of individually addressable electromagnets 67. The magnets of the array can be independently turned on to generate a magnetic field or off away from the channels 10 of the device (FIG. 5A). The magnet arrays of FIGS. 6A–6C can be programmed to move in a given pattern with time, to move up and/or down in a given pattern with time or to turn on and off in a given pattern with time to accomplish a desired valving or fluid handling application. The magnet arrays can be uniform grids with uniform spacing between magnets or the array can be constructed with magnets positioned and spaced so that the magnets therein align with flow channels or align with desired fluid paths in the device.

Figures 7A, 7B, 7C:
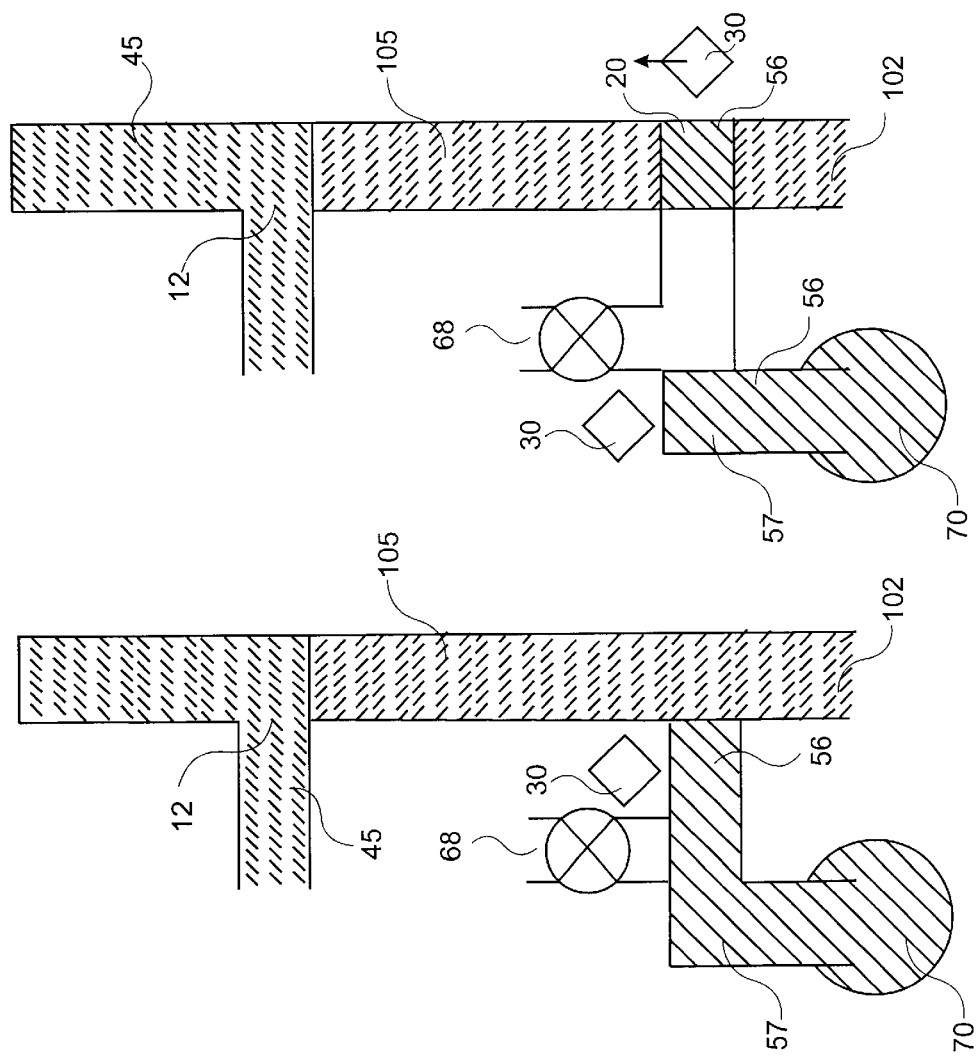
FIGS. 7A, 7B, and 7C are top plan diagrams of a sixth fluid handling device which uses a buffer fluid to isolate the sample fluid from the magnetic fluid slug, illustrating three stages in using a slug to push the fluids along a flow channel.

FIGS. 7A, 7B, and 7C illustrate a sequence of steps, respectively, by which a fluid handling device slightly different from that shown in FIG. 4A can be used to dispense controlled amounts of sample fluid 45 isolated from the magnetic fluid 56 by a buffer fluid 105. The use of a buffer fluid limits any contamination of the sample fluid by the magnetic fluid. In FIG. 7A, buffer fluid 105 is injected into the flow channel 10 through a buffer fluid inlet 102. In FIG. 7B, sample fluid 45 is injected into the flow channel through a sample fluid inlet 12. In FIG. 7C, a slug 20 is pulled into the flow channel as described previously for FIG. 4B. By controlling the distance the slug 20 travels in the flow channel 10, the amount of sample fluid dispensed can also be controlled.

Figure 8B:
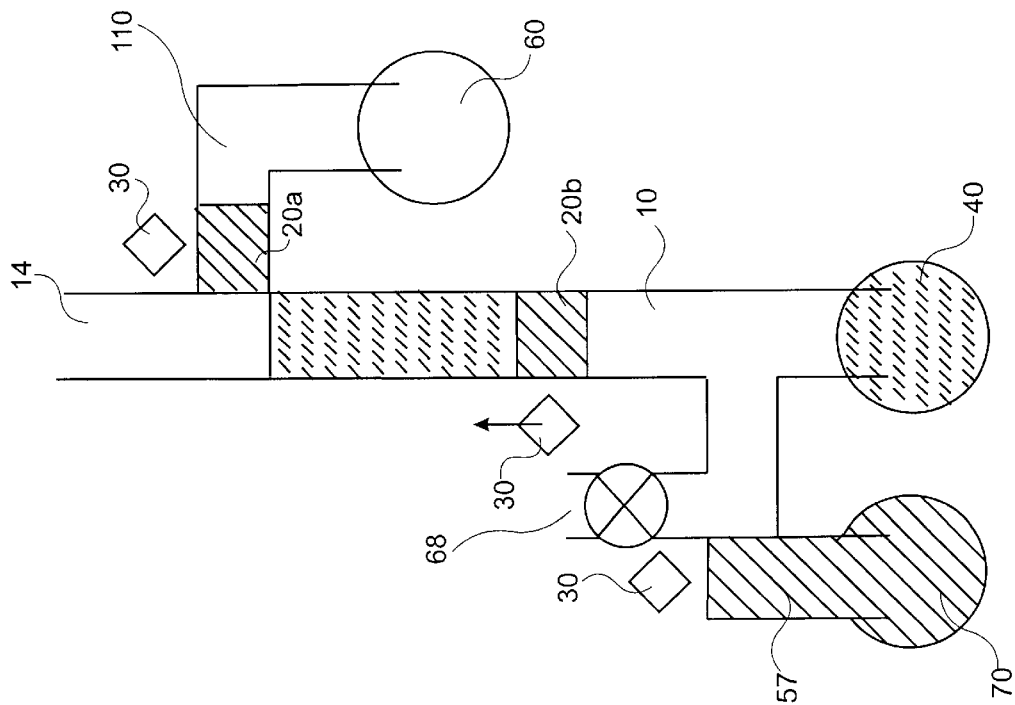
FIGS. 8A and 8B are top plan diagrams of a seventh fluid handling device illustrating two stages in using two magnetic fluid slugs to pull, then push fluid along a flow channel.
Figure 8A:
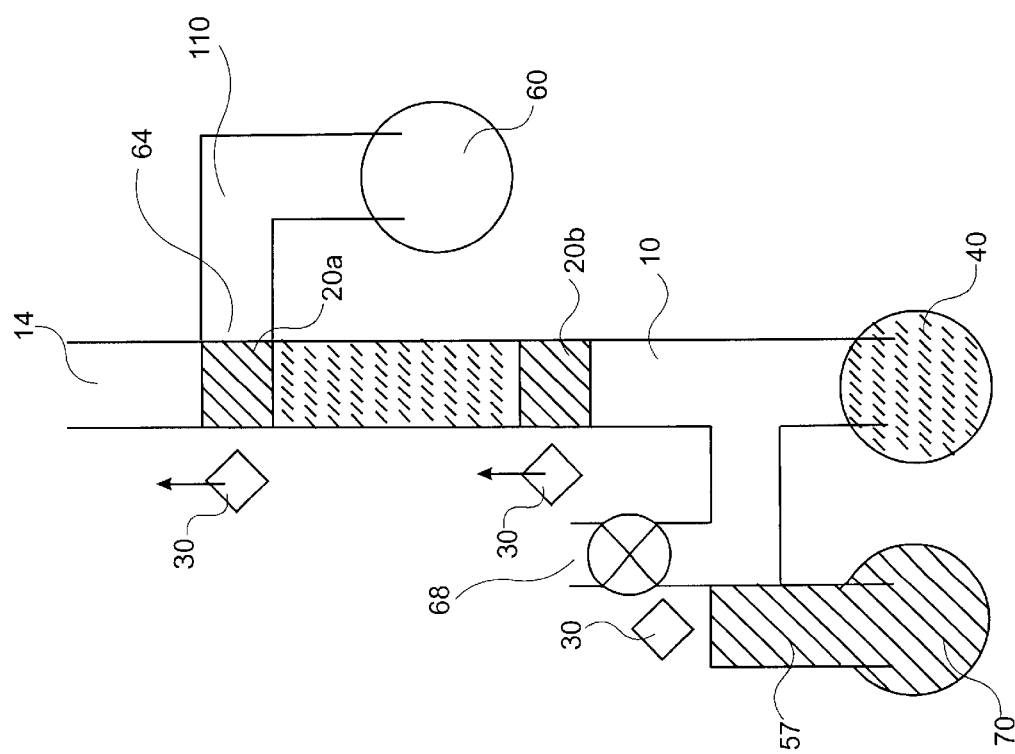

FIGS. 8A and 8B show a fluid handling device which additionally contains a slug outlet 64 for conducting a slug out of the flow channel, the slug outlet being in fluid communication with the flow channel. The slug outlet can include outlet channels, which may be connected to magnetic fluid collection reservoir 60. In FIG. 8A, the slug outlet is shown as an outlet channel 110 connected to a magnetic fluid collection reservoir 60. The slug outlet can contain a valve to limit fluid flow into the outlet or the closed end of a reservoir can limit fluid flow into the outlet. In FIG. 8B, a magnetic fluid slug 20a is moved into the outlet to act as a valve.

FIGS. 8A and 8B illustrate another way that two magnetic fluid slugs 20a and 20b can be used to push and pull fluid through the flow channel 10 and through an outlet 14. FIG. 8A shows two magnetic slugs 20a and 20b moving fluid along the channel as previously described for FIG. 4C. As shown in FIG. 8B, when the first slug 20a reaches the outlet channel 110, a magnet 30 is used to move it into the outlet channel 110 and hold it there, thus creating a valve blocking fluid flow into that channel. The second slug 20b can then push fluid ahead of it along the flow channel and through the outlet 14. More than two slugs can be used to pump greater quantities of fluid from the reservoir. In this case, each slug is inserted into the flow channel and moved along the channel and out the outlet, thereby pushing fluid ahead of it towards the fluid outlet. The magnetic slugs are collected in magnetic fluid collection reservoir 60 and may be recycled for use. The ability to divert the slug in front of the fluid can simplify fluid delivery to the next stage of a microfluidic device.

Figure 9A:
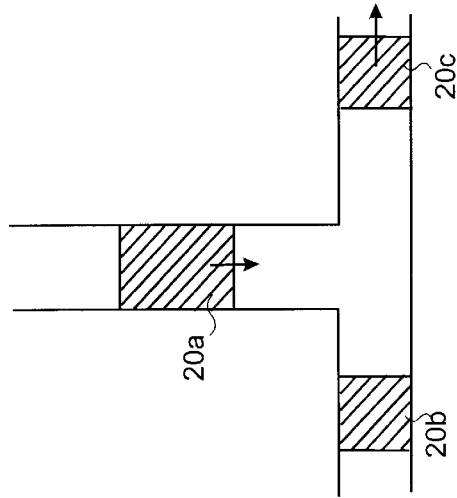
FIGS. 9A, 9B, 9C, and 9D are top plan diagrams illustrating four stages in using three magnetic fluid slugs to mix two fluids together.
Figure 9B:
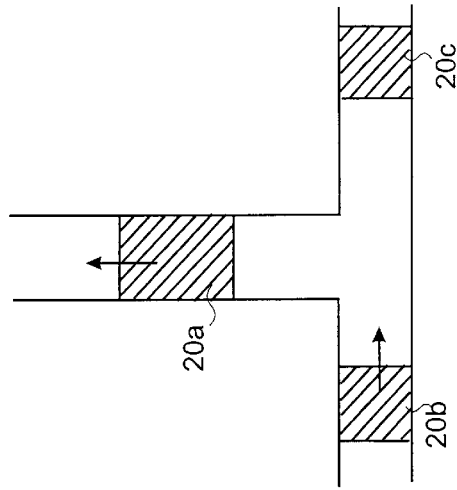
Figure 9C:
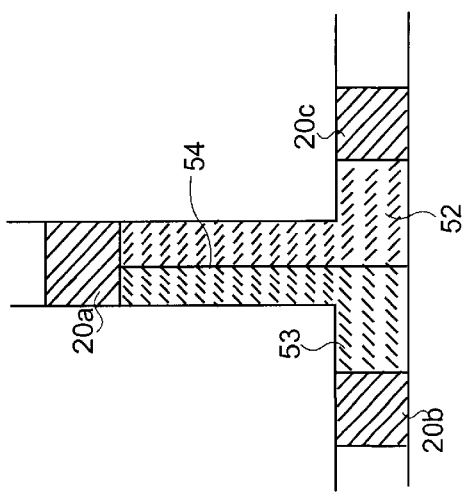
Figure 9D:
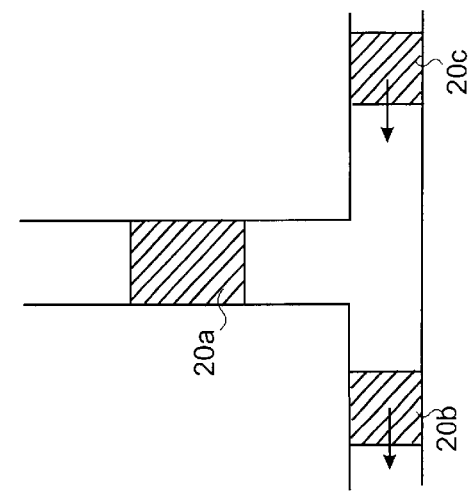

FIGS. 9A through 9D illustrate how three magnetic fluid slugs 20a, 20b and 20c can be used to mix two fluids at an microchannel intersection. The magnets are not shown. In FIG. 9A, two fluids, first fluid 52 and second fluid 53 have been drawn into a T intersection of a channel (initial fluid separation indicated by line 54) where diffusion between them will begin to occur. In FIGS. 9B–9D, the directions of slug movement are changed to mix the liquids and achieve faster diffusion between the two liquids.

The basic fluid handling devices described above can also be combined for use in microfluidic circuits incorporating H-Filters, micromixers, microcytometers and many other microfluidic components, as will be apparent to those skilled in the art. Other microfluidic applications for which such fluid handling devices can be useful are cell patterning, which requires controlled input flow rates (Kenis, P. J., Ismagilov, R. F., and Whitesides, G. M. (1999), Science, 285:83–85), separation of particles by dielectrophoresis, which requires pressure driven flow (Sang, J. et al. (1999), Analytical Chemistry, 71:911–918), and flow injection analysis, which requires very fast controlled flow (Hodder, P. S., Blankenstein, G. and, Ruzicka, J.(1997), Analyst, 122:883–887, Bokenkamp, R. et al. (1998), Analytical Chemistry, 70:232–236).

Figure 10:
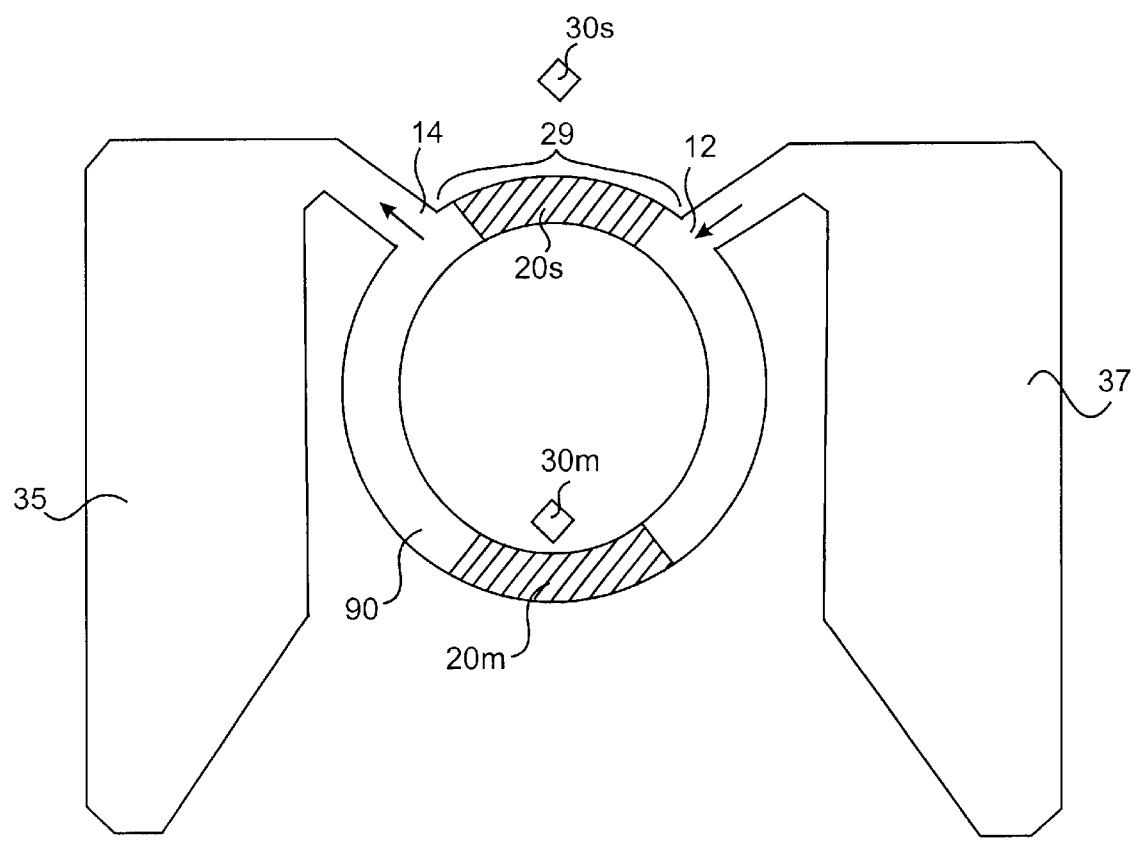
FIG. 10 is a top plan diagram of a magnetically actuated fluid handling device with a circular flow channel loop, one moving slug, and one stationary slug, showing another aspect of the present invention (not to scale).

FIG. 10 shows a top plan diagram of a magnetically actuated micropump with a flow channel which forms a loop. In this diagram, the loop-forming flow channel 90 is circular, although the flow channel is not limited to a circular shape. The flow channel is in fluid communication with a fluid inlet 12, and a fluid outlet 14, both depicted as channels connected to inlet and outlet reservoirs 37 and 35, respectively. The fluid inlet is defined such that the net flow of fluid through the inlet over one pump cycle is into the pump. Similarly, the fluid outlet is defined such that the net flow of fluid through the outlet over one pump cycle is out of the pump.

FIG. 10 shows two slugs of magnetic fluid, a moving slug 20m and a stationary slug 20s both located within the flow channel 90. The pump contains a first inlet 12 and a last outlet 14 separated by a channel volume 29. The moving magnetic fluid slug in FIG. 10 is moved around the flow channel loop by a moving magnet 30m. The volume of the moving slug preferably is less than the volume 29 of the flow channel between the first fluid inlet and last outlet and is preferably the same as that of the stationary slug. The magnetic slug 20m may be moved by a variety of known mechanical and electronic techniques. The stationary slug in FIG. 10 20s is held stationary between the first fluid inlet and the last fluid outlet using a stationary magnet 30s. In this embodiment, the volume of the stationary slug should be less than volume 29 between the first fluid inlet and last outlet on either side of the stationary slug, except when the two slugs are merged.

The pump shown in FIG. 10 operates as follows. As the moving slug 20s is moved clockwise through the flow channel 90 between the inlet 12 and the outlet 14, it forces fluid in through the inlet and out through the outlet. As the moving slug approaches the stationary slug, it pushes all the fluid ahead of it out through the outlet before it merges with the stationary slug. While the two slugs are merged, no pumping action occurs. The two slugs remain merged until a magnet provides a field sufficient to pinch off a new movable slug 20m from the merged slugs. When a mechanically or electrically (clockwise) rotating permanent magnet 30m controls the position of the moving slug, the moving slug emerges from the merged slug when the rotating magnet passes the inlet. Once the moving slug moves past the inlet, the pumping cycle repeats itself.

Because the pumping rate may not be constant over time, a single pump is most useful for applications that are not affected by pulsatility. For example, an application may require a uniform flow rate only over a short period of time. If that time period is less than the time period over which the pump produces a uniform flow rate, the application is not affected by the pump pulsatility. If a rotating permanent magnet controls the position of the moving slug, the pump pulsatility can be reduced by increasing the rotation speed of the magnet while the moving slug is merged with the stationary slug. Similarly, if a magnet array controls the position of the moving slug, the pump pulsatility can be reduced by increasing the rate of switching between magnet array elements mapping the flow channel while the moving slug is merged with the stationary slug.

Figure 11:
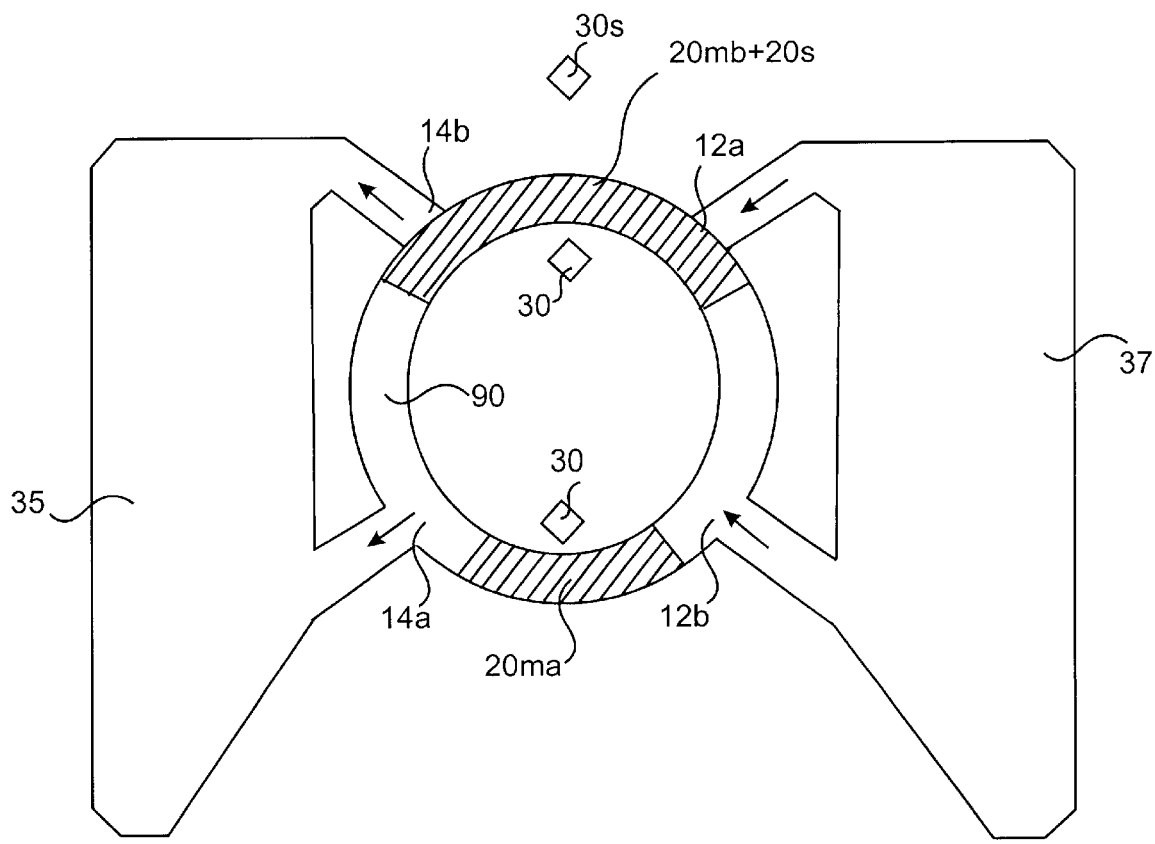
FIG. 11 shows a top plan diagram of a second fluid handling device with a circular flow channel loop, showing a device with two inlets and outlets.

FIG. 11 shows a pump design which uses one stationary slug 20s and two moving slugs 20ma and 20mb. Loop micropumps such as this with more than one set of inlets and outlets can be used to produce a more constant pumping rate. The loop pump has two inlets and two outlets including a first inlet 12a and a last outlet 14b. Both outlets 14a and 14b are connected to outlet reservoir 35 and both inlets 12a and 12b are connected to inlet reservoir 37. In FIG. 11, one moving slug 20ma is at the bottom of the flow channel and the other is merged with the stationary slug (20mb+20s) at the top of the flow channel. The arrows show the direction of fluid flow. It is evident that for this design, fluid flows through the pump even when the stationary slug is merged with one moving slug, because of the pumping action of the second moving slug 20mb. Therefore, pump pulsatility is reduced. If more than one set of inlets or outlets are present in the design, there should be at least one stationary slug and at least two moving slugs.

The amount of magnetic fluid used for each stationary slug is limited by the requirement that the stationary slug be small enough not to block its adjacent pump inlet and outlet (the first inlet and the last outlet) except when it is merged with a moving slug. The amount of magnetic fluid used for each moving slug is preferably small enough so that the slug does not block the most closely-spaced pump inlet and outlet which does not contain a stationary slug between the inlet and outlet. Preferably, both moving and stationary slugs have the same volume, with one stationary slug being placed between the most closely-spaced inlet and outlet and having the same volume as the volume of the flow channel between that inlet and outlet. There may be one or more stationary slugs in a loop flow channel. If individual permanent magnets rather than magnet arrays are used to control slug positions, additional permanent magnets are required when additional slugs are used.

Figure 12:
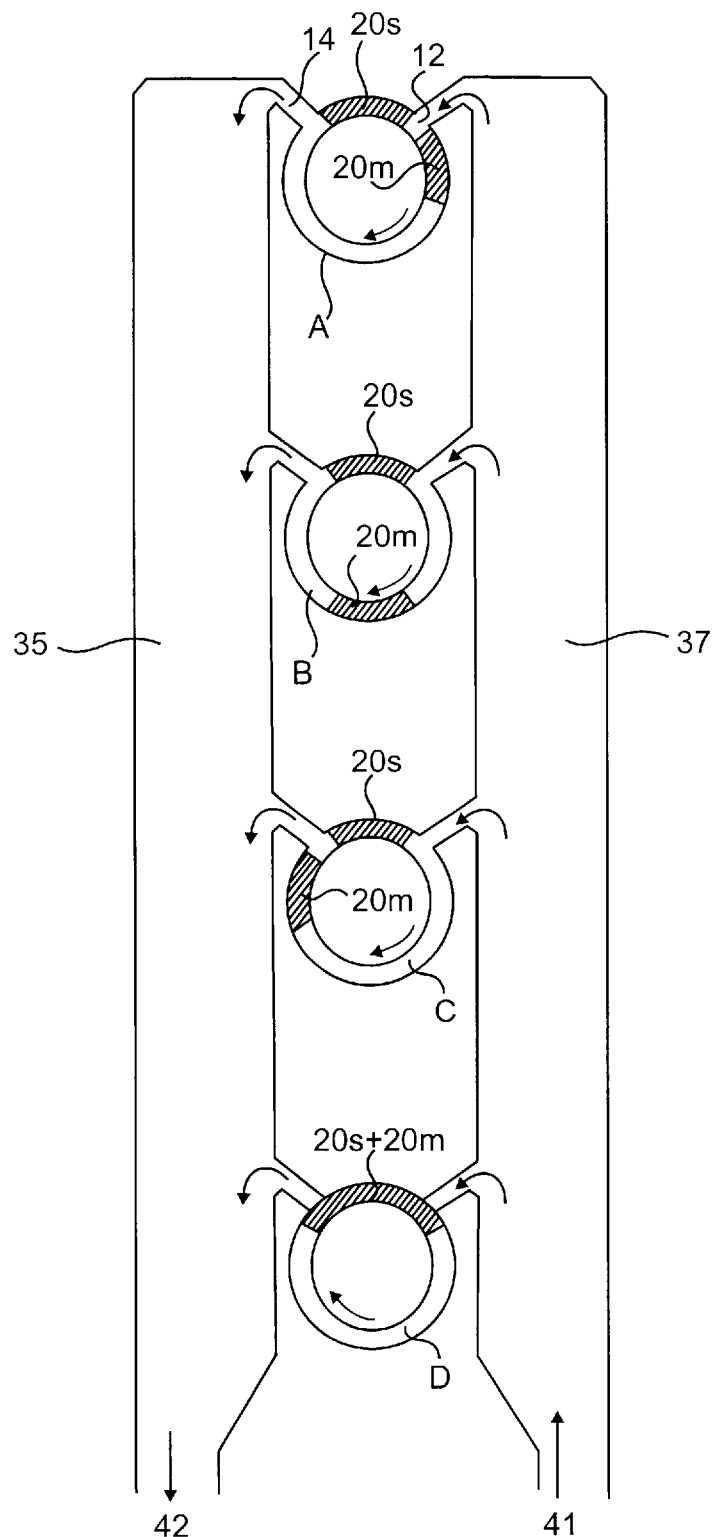
FIG. 12 shows a top plan diagram of a microfluidic device with a plurality of loop pumps. The exemplified device combines four separate loop pumps in parallel on a single substrate.

In addition, averaging the output of multiple pumps with loop-forming flow channels can be used to obtain a more constant pumping rate over time. FIG. 12 illustrates such a microfluidic device which combines four separate loop pumps in parallel connected to an inlet reservoir 37 and an outlet reservoir 35. The inlet reservoir is in fluid communication with a main reservoir or other fluid source 41 and the outlet reservoir is in fluid communication with a device 42 to which the fluid is to be delivered. Alternatively, a loop pump or multiple loop pump configuration can be used to pump fluid from a device to a fluid exit, fluid waste stream or like conduit. The pumps are similar to those shown in FIG. 10 and are labeled A through D. For simplicity, the magnets are not shown; however, the direction of motion of the moving slugs is indicated by arrows. In FIG. 12, the pump timing is adjusted so that the position of the moving slug in each pump is ninety degrees ahead of the position of the moving slug in the pump above it (e.g., the position of the moving slug in pump B is ninety degrees ahead of that in pump A). With this configuration, only one pump at a time is in the inactive part of the cycle where the moving and stationary slugs are merged. In FIG. 12, pump D is shown in the inactive part of the cycle. The relative positions of the individual pumps in the device of FIG. 12 are not critical. The relative timing of slug passage in the loops is, however, important to achieve a more constant pumping rate. The offset between the positions of the moving slugs can be selected to be compatible with the volume of the moving slugs and the channel volumes between the last outlets and the first inlets. It may be beneficial in a multiple loop pump device like that of FIG. 12 to adjust the relative sizes of inlet and outlet channels, the sizes of the reservoirs or the positioning of channels communicating with the fluid source or device to optimize fluidic distribution in the device and to minimize backwards pumping in the device.

Figure 13:
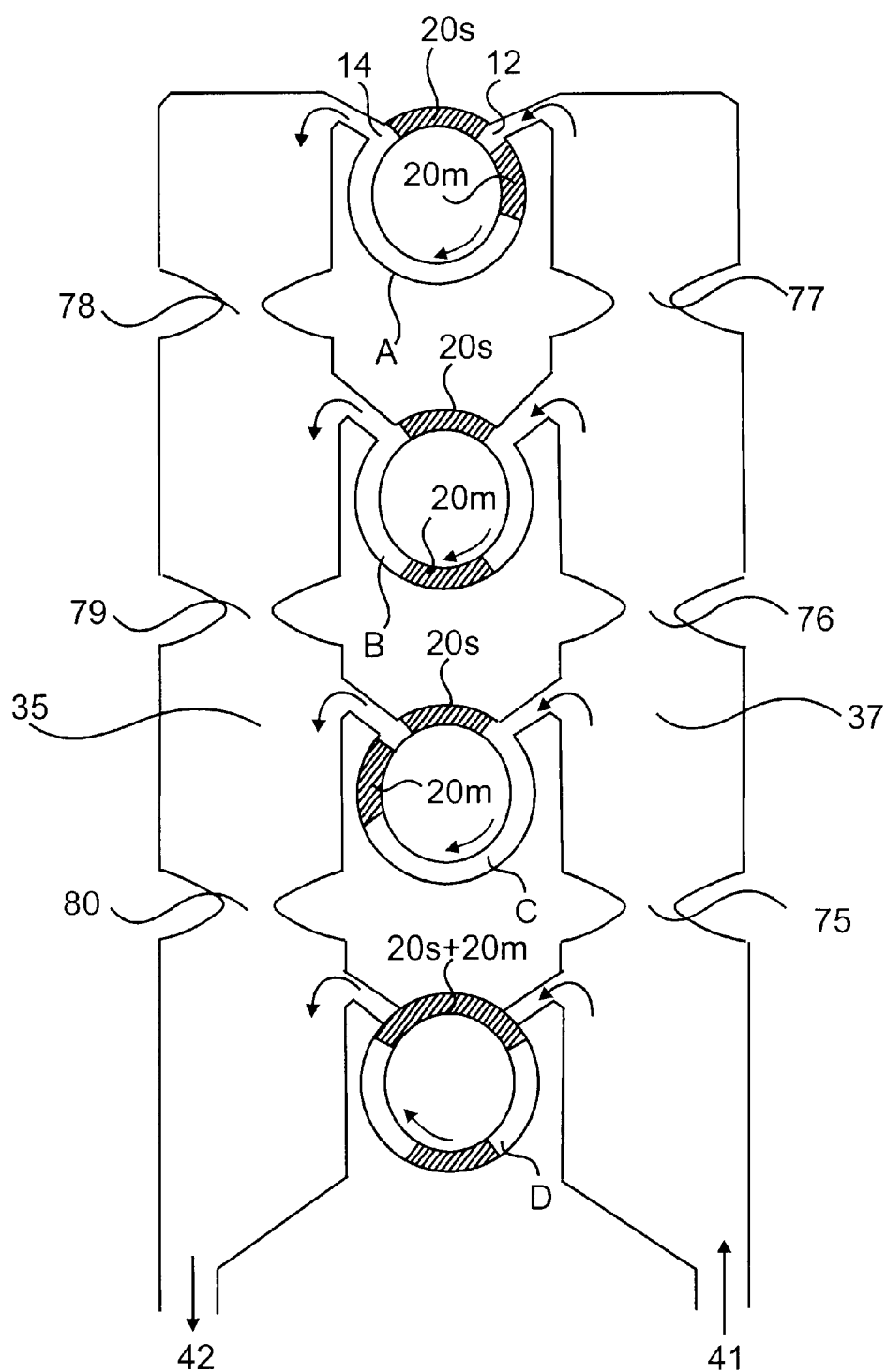
FIG. 13 shows a top plan diagram of a microfluidic device of FIG. 12 with exemplary channel restrictions to improve fluidic distribution in the device.

An exemplary microfluidic device of FIG. 12 with channel restrictions to improve fluid distribution in the device is shown in FIG. 13 which illustrates channel restrictions 75–77 in the inlet reservoir and channel restrictions 78–80 in the outlet reservoir. The relative widths of the channel restrictions, which are positioned in the inlet and outlet reservoirs between adjacent inlets and outlets, respectively, are selected to improve pump efficiency in the directions indicated by arrows and to minimize backward pumping and any displacement of stationary plugs. In the specific embodiment shown, the restrictions increase in width in the order 75<76<77 and 78<79<80. Further, restriction 78 (in the outlet reservoir) is smaller in width than restriction 77 (in the inlet reservoir).

The multiple loop pump devices of FIGS. 12 and 13 can be implemented on a single substrate. Multiple loop pumps can also be combined in parallel by stacking them in a multilayer device as described in U.S. patent application Ser. No. 09/080,691 (Liquid Analysis Cartridge) which is incorporated by reference herein to the extent not inconsistent herewith.

Figure 14A:
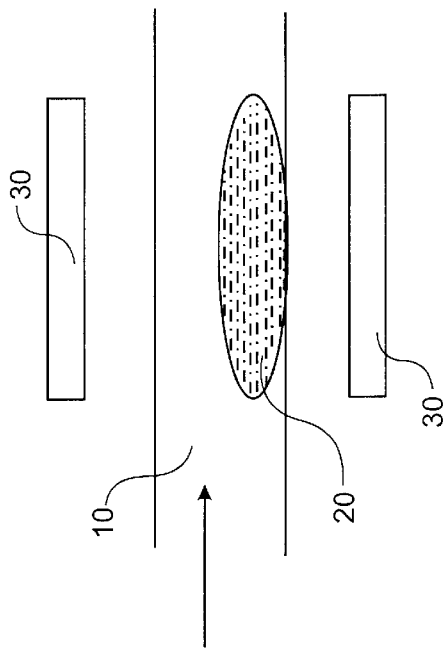
FIG. 14A shows a top plan view of a microchannel containing a ferrogel valve of this invention in the closed position.
Figure 14B:
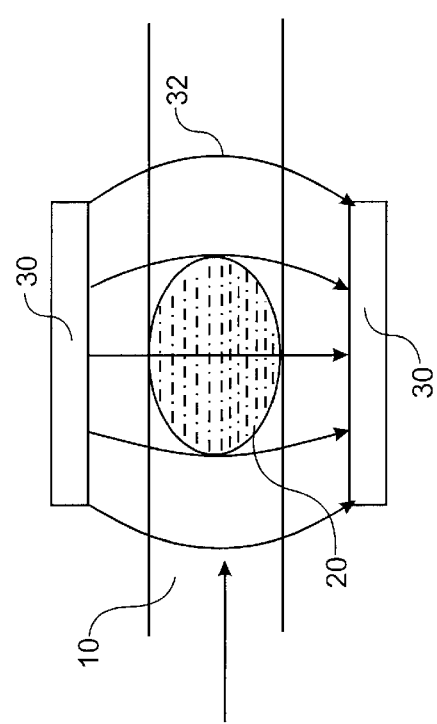
FIG. 14B shows the valve in open position.

FIGS. 14A and 14B depict a microfluidic valve formed in a microchannel 10 with a slug of magnetic fluid 20 made of a ferrogel. When magnets 30 are activated creating a magnetic field 32, as shown in FIG. 14A, the ferrogel responds by deforming to fill the microchannel 10 and block flow of liquid (indicated by the arrow) in the microchannel. When magnets 30 are inactive, the ferrogel 20 flattens, as shown in FIG. 14B, leaving space within the microchannel 10 for fluid to flow.

Figure 15:
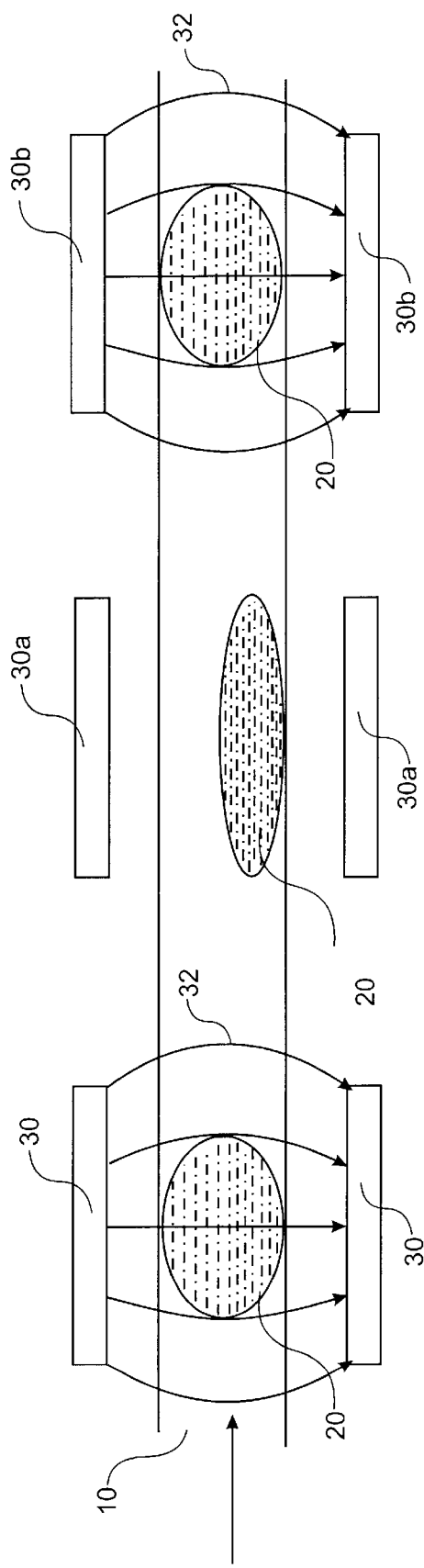
FIG. 15 shows a top plan view of a microchannel containing a perstaltic pump element of this invention using a ferrogel.

FIG. 15 shows a peristaltic pump using successive slugs of ferrogel 20. When the first set of magnets 30 are activated, the ferrogel fills microchannel 10, temporarily blocking fluid flow and squeezing fluid forward to the next set of magnets, 30a, which are off, allowing fluid flow through the microchannel, to the third set of magnets 30b which are activated, temporarily blocking fluid flow. Pulsing activation of the magnets causes peristaltic flow of the fluid within the channel.

The fluid handling devices described above can include a substrate or base member and a cover plate, not shown, which closes the channel. Preferably the base is a plastic material or silicon, although other similar materials could be used, such as glass, fused silica, crystalline quartz, fused quartz, and polysilicon. Preferably, the cover is plastic for a plastic base or glass for a silicon base, although similar materials could be used as already described for the base.

The flow channels are preferably formed in the planar surface of a plastic substrate using laser cutting and lamination. However, other means known to the art such as microinjection molding can also be used. The flow channels are preferably formed in the planar surface of a silicon substrate using standard photolithographic procedures followed by wet chemical etching. However, other micromachining processes may be used, such as LACE, LIGA, reactive ion etching, and sputter etching.

The depth of the flow channels is preferably between about 20 microns and about 1 mm. The width of the channels is preferably no greater than about 1 mm, and preferably between 100 and 400 microns. The dimensions of the device are chosen such that laminar flow is maintained and that the Reynolds number is preferably less than or equal to about 1. The channel dimensions are also selected so that the flow resistance in the channel can be overcome with the magnets selected. With a silicon base, wet chemical etching of the base results in a trapezoidal channel geometry. The angles of the channel walls with respect to the top surface of the base vary around the channel due to the etching differences for different crystal planes. With a plastic base, laser cutting and lamination would produce a rectangular channel geometry. The surface of the flow channels in the base and the lower surface of the cover plate can be treated with an oxygen plasma or using other processes to adjust the surface energy of the channel and modify its wettability by the fluid and the slug material (Flounders, A. W., Brandon, D. L., and Bates, A. H (1997), "Patterning of Immobilized Antibody Layers via Photolithography and Oxygen Plasma Exposure", Biosens. Bioelecton. 12:(6):447–456 and Ratner, B. D. (1995), "Surface Modification of Polymers: Chemical, Biological and Surface Analytical Challenges", Biosens. Bioelecton. 10, (9–10):797–804).

The preferred embodiments described above illustrate rather than limit the invention. As will be understood by those skilled in the art, various materials, processes and parameters can be varied to achieve the objectives of this invention to provide microsized fluid handling devices. This invention is limited only by the scope of the claims appended thereto.

All references cited herein are incorporated by reference herein to the extent not inconsistent with the disclosure herein.

We claim:

1. A fluid handling device having at least one fluid inlet and at least one fluid outlet comprising:
   a plurality of microsized flow channels, each channel being in fluid communication with at least one of the fluid inlets and at least one of the fluid outlets, wherein at least one channel branches off from another channel; and
   one or more slugs of magnetic fluid located in at least one of the flow channels, wherein a slug can be held stationary or moved in the channel by at least one magnet and wherein a slug blocks fluid flow through the channel when it is stationary and a slug pulls or pushes fluid through the channel when it is moved.

2. The fluid handling device of claim 1, further comprising at least one slug inlet in fluid communication with the flow channel for conducting the slug into the flow channel.

3. The fluid handling device of claim 2, wherein the slug inlet comprises a flow channel containing at least one vent.

4. The fluid handling device of claim 1, farther comprising at least one slug outlet in fluid communication with the flow channel for conducting the slug out of the flow channel.

5. The fluid handling device of claim 2, further comprising at least one slug outlet in fluid communication with the flow channel for conducting the slug out of the flow channel.

6. The fluid handling device of claim 1, wherein an array of magnets is used to move one or more slugs through the flow channel.

7. The fluid handling device of claim 6 wherein the array of magnets is an array of electromagnets.

8. The fluid handling device of claim 1 wherein the magnetic fluid is a ferrofluid.

9. The fluid handling device of claim 1 wherein the magnetic fluid is a ferrogel.

10. The fluid handling device of claim 1 for handling liquid fluids.

11. The fluid handling device of claim 1 for handling aqueous media.

12. The fluid handling device of claim 1 for handling fluids that are gases.

13. A microfluidic device comprising a fluid handling device of claim 1.

14. A microfluidic device comprising a pluralit of fluid handling devices of claim 1.

15. A method for moving fluid in a fluid handling device having at least one fluid inlet and at least one fluid outlet comprising the steps of:
   providing a plurality of microsized flow channels, each channel, being in fluid communication with at least one fluid inlet and at least one fluid outlet, wherein at least one channel branches off from another channel;
   providing one or more slugs of magnetic fluid located within at least one of the flow channels, a slug being either held stationary or moved by at least one magnet and wherein at least one of the slugs comprises a ferrogel; and
   using at least one magnet to move a slug through the flow channel causing a net flow of fluid into the fluid inlet and a net outflow of fluid out of the fluid outlet.

16. A fluid handling device comprising:
   at least one microsized flow channel forming a loop, the flow channel being in fluid communication with at least a first fluid inlet and at least a last fluid outlet;
   at least a first and second slug of magnetic fluid; both located within the flow channel;
   at least one magnet arranged and adapted so as to control said first slug to move within said flow channel;
   wherein, the volue of said first slug is less than the volume between a most closely-spaced fluid inlet and outlet of said device;
   at least one magnet arranged and adapted so as to control said second slug in a stationary position between the first fluid inlet and the last fluid outlet;
   wherein, the volue of the stationary slug is less than the volume between the first fluid inlet and the last fluid outlet on either side of the slug.

17. The fluid-handling device of claim 16 comprising:

at least two sets of fluid inlets and outlets; and at least a third slug of magnetic fluid under control of a magnet arranged and adapted so as to control said third slug to move within said flow channel.

18. The fluid handling device of claim 16 wherein the loop is circular.

19. The fluid handling device of claim 16 wherein the magnets are permanent magnets and at least one of the magnets is mechanically moveable to follow the path of the loop.

20. The fluid handling device of claim 16 having one stationary slug and two moving slugs.

21. A microfluidic device comprising a fluid handling devices of claim 16.

22. A microfluidic device comprising a plurality of fluid-handling devices of claim 16.

23. A microfluidic device comprising at least two of the fluid handling devices of claim 20 wherein:

the fluid inlets of the fluid handling devices are in fluid communication with each other by means other than the microsized flow channel; and/or the fluid outlets of the fluid handling devices are in fluid communication with each other by means other than the microsized flow channel; and the magnets which move the slugs around the flow channel loops can be operated such that when the moving slug in the first device is merged with the stationary slug of that device, the moving slug of at least one other device is not merged with the stationary slug of that device.

24. The microfluidic device of claim 23 comprising a plurality of slugs of magnetic gel located within the flow channel, capable of changing shape under magnetic control to induce fluid flow within said channel.

25. A method for moving a fluid in a microfluidic device comprising the steps of:

providing in the microfluidic device a microsized flow channel forming a loop, the flow channel being in fluid communication with one or more fluid inlets and outlets wherein there is at least one first fluid inlet and at least one last fluid outlet;

forming at least two slugs of a magnetic fluid material located within the flow channel;

using at least one magnet to hold at least one slug stationary between the first fluid inlet and the last fluid outlet so that fluid in the loop cannot flow from the last fluid outlet to the first fluid inlet; and using at least one magnet to move at least one slug around the flow channel loop, thereby causing a net inflow of fluid into the fluid inlet and a net outflow of fluid out of the fluid outlet.

26. A microfluidic fluid handling device comprising:

at least one microsized flow channel in fluid communication with at least one fluid inlet and at least one fluid outlet; and at least one slug of magnetic gel located within the flow channel whose shape can be controlled by at least one magnet to block the flow of fluid in said microchannel or to allow fluid flow within said microchannel.

* * * * *